United States Patent
Chang et al.

(10) Patent No.: US 9,348,117 B1
(45) Date of Patent: May 24, 2016

(54) PHOTOGRAPHING OPTICAL LENS ASSEMBLY, IMAGE CAPTURING UNIT AND ELECTRONIC DEVICE

(71) Applicant: LARGAN PRECISION CO., LTD., Taichung (TW)

(72) Inventors: Chien-Pang Chang, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/739,176

(22) Filed: Jun. 15, 2015

(30) Foreign Application Priority Data

Mar. 20, 2015  (TW) .............................. 104204235 U

(51) Int. Cl.
G02B 9/60 (2006.01)
G02B 13/00 (2006.01)
G02B 27/64 (2006.01)
G02B 5/22 (2006.01)
G02B 5/26 (2006.01)
H04N 5/225 (2006.01)

(52) U.S. Cl.
CPC .............. *G02B 13/0045* (2013.01); *G02B 5/22* (2013.01); *G02B 5/26* (2013.01); *G02B 9/60* (2013.01); *G02B 27/646* (2013.01); *H04N 5/2254* (2013.01)

(58) Field of Classification Search
CPC .... G02B 13/0045; G02B 27/646; G02B 5/22; G02B 5/26; G02B 9/60
See application file for complete search history.

(56) References Cited

U.S. PATENT DOCUMENTS

| 8,467,125 | B2 | 6/2013 | Nakanishi | |
| 8,531,786 | B2* | 9/2013 | Tsai | G02B 13/0045 359/714 |
| 2009/0043067 | A1 | 2/2009 | Morita | |
| 2014/0078603 | A1* | 3/2014 | You | G02B 13/0045 359/738 |
| 2014/0118849 | A1 | 5/2014 | Mori | |
| 2014/0126068 | A1 | 5/2014 | Tsutsumi et al. | |
| 2014/0176681 | A1 | 6/2014 | Ono | |

* cited by examiner

*Primary Examiner* — Joseph P Martinez
(74) *Attorney, Agent, or Firm* — McClure, Qualey & Rodack, LLP

(57) ABSTRACT

A photographing optical lens assembly includes, in order from an object side to an image side, a first lens element, a second lens element, a third lens element, a fourth lens element and a fifth lens element. The first lens element with positive refractive power has a convex object-side surface, wherein the object-side surface and an image-side surface thereof are aspheric. The second lens element has negative refractive power, wherein an object-side surface and an image-side surface thereof are aspheric. The third lens element has refractive power, wherein an object-side surface and an image-side surface thereof are aspheric. The fourth lens element has positive refractive power, wherein an object-side surface and an image-side surface thereof are aspheric. The fifth lens element with negative refractive power has a concave image-side surface, wherein an object-side surface and the image-side surface thereof are aspheric.

35 Claims, 18 Drawing Sheets

PHOTOGRAPHING OPTICAL LENS ASSEMBLY, IMAGE CAPTURING UNIT AND ELECTRONIC DEVICE

RELATED APPLICATIONS

This application claims priority to Taiwan Application Serial Number 104204235, filed Mar. 20, 2015, which is herein incorporated by reference.

BACKGROUND

1. Technical Field

The present disclosure relates to a photographing optical lens assembly and an image capturing unit. More particularly, the present disclosure relates to a photographing optical lens assembly and image capturing unit applicable to electronic devices.

2. Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Although the optical system having multiple lens elements has been developed, in response to the popularity of wearable apparatus and mobile terminals, and the current of products having multiple optical systems, the total track length of the optical system is reduced for applications in the wearable apparatus, the mobile terminals and products having multiple optical systems. However, when the total track length of the optical system is reduced to a certain limit while increasing the imaging pixels, the difficulty of correcting aberration is increased, and the color cast cannot be corrected. As a result, the photographed image is distorted and unnatural, and the image quality is poor.

SUMMARY

According to one aspect of the present disclosure, a photographing optical lens assembly includes, in order from an object side to an image side, a first lens element, a second lens element, a third lens element, a fourth lens element and a fifth lens element. The first lens element with positive refractive power has a convex object-side surface, wherein the object-side surface and an image-side surface of the first lens element are aspheric. The second lens element has negative refractive power, wherein an object-side surface and an image-side surface of the second lens element are aspheric. The third lens element has refractive power, wherein an object-side surface and an image-side surface of the third lens element are aspheric. The fourth lens element has positive refractive power, wherein an object-side surface and an image-side surface of the fourth lens element are aspheric. The fifth lens element with negative refractive power has a concave image-side surface, wherein an object-side surface and the image-side surface of the fifth lens element are aspheric, and at least one of the object-side surface and the image-side surface thereof has at least one inflection point. The photographing optical lens assembly has a total of five lens elements with refractive power. There is an air space between every two lens elements of the first lens element, the second lens element, the third lens element, the fourth lens element and the fifth lens element adjacent to each other. When a wavelength correspondent to a 50% transmittance of the photographing optical lens assembly is $\lambda t50$, a sum of central thicknesses of the lens elements with refractive power is $\Sigma CT$, an axial distance between an object-side surface of a lens element closest to an object and an image-side surface of a lens element closest to an image surface is TD, a curvature radius of the object-side surface of the lens element closest to the object is R1, a curvature radius of the image-side surface of the lens element closest to the image surface is Rlast, and an axial distance between the object-side surface of the lens element closest to the object and the image surface is TL, the following conditions are satisfied:

$$0.00 \text{ nm} < (\lambda t50 - 400 \text{ nm}) \times (500 \text{ nm} - \lambda t50)/\lambda t50 < 5.55 \text{ nm};$$

$$0.50 < \Sigma CT/TD < 0.90;$$

$$0 < R1/R\text{last} < 3.0; \text{ and}$$

$$TL < 8.5 \text{ mm}.$$

According to another aspect of the present disclosure, an image capturing unit includes the photographing optical lens assembly according to the aforementioned aspect and an image sensor, wherein the image sensor is disposed on the image surface of the photographing optical lens assembly. When a side length of a pixel of the image sensor is Lth, the following condition is satisfied:

$$L\text{th} < 1.6 \text{ μm}.$$

According to further another aspect of the present disclosure, a photographing optical lens assembly includes, in order from an object side to an image side, a first lens element, a second lens element, a third lens element, a fourth lens element and a fifth lens element. The first lens element with positive refractive power has a convex object-side surface, wherein the object-side surface and an image-side surface of the first lens element are aspheric. The second lens element with negative refractive power has a concave image-side surface, wherein an object-side surface and the image-side surface of the second lens element are aspheric. The third lens element has refractive power, wherein an object-side surface and an image-side surface of the third lens element are aspheric. The fourth lens element has negative refractive power, wherein an object-side surface and an image-side surface of the fourth lens element are aspheric. The fifth lens element with refractive power has a concave image-side surface, wherein an object-side surface and the image-side surface of the fifth lens element are aspheric, and at least one of the object-side surface and the image-side surface thereof has at least one inflection point. The photographing optical lens assembly has a total of five lens elements with refractive power. There is an air space between every two lens elements of the first lens element, the second lens element, the third lens element, the fourth lens element and the fifth lens element adjacent to each other. When a wavelength correspondent to a 50% transmittance of the photographing optical lens assembly is $\lambda t50$, a sum of central thicknesses of the lens elements with refractive power is ΣCT, an axial distance between an object-side surface of a lens element closest to an object and an image-side surface of a lens element closest to an image surface is TD, a curvature radius of the object-side surface of the lens element closest to the object is R1, a curvature radius of the image-side surface of the lens element closest to the image surface is Rlast, and an axial distance between the object-side surface of the lens element closest to the object and the image surface is TL, the following conditions are satisfied:

0.00 nm<(λt50−400 nm)×(500 nm−λt50)/λt50<5.55 nm;

0.50<ΣCT/TD<0.90;

0<R1/Rlast<3.0; and

TL<8.5 mm.

According to still another aspect of the present disclosure, a photographing optical lens assembly includes, in order from an object side to an image side, a first lens element, a second lens element, a third lens element, a fourth lens element, a fifth lens element and a sixth lens element. The first lens element with positive refractive power has a convex object-side surface, wherein the object-side surface and an image-side surface of the first lens element are aspheric. The second lens element has refractive power, wherein an object-side surface and an image-side surface of the second lens element are aspheric, and the second lens element is made of plastic material. The third lens element has refractive power, wherein an object-side surface and an image-side surface of the third lens element are aspheric, and the third lens element is made of plastic material. The fourth lens element has refractive power, wherein an object-side surface and an image-side surface of the fourth lens element are aspheric, and the fourth lens element is made of plastic material. The fifth lens element has refractive power, wherein an object-side surface and an image-side surface of the fifth lens element are aspheric, and the fifth lens element is made of plastic material. The sixth lens element with refractive power has a concave image-side surface, wherein an object-side surface and the image-side surface of the sixth lens element are aspheric, at least one of the object-side surface and the image-side surface thereof has at least one inflection point, and the sixth lens element is made of plastic material. The photographing optical lens assembly has a total of six lens elements with refractive power. There is an air space between every two lens elements of the first lens element, the second lens element, the third lens element, the fourth lens element, the fifth lens element and the sixth lens element adjacent to each other. When a wavelength correspondent to a 50% transmittance of the photographing optical lens assembly is λt50, a sum of central thicknesses of the lens elements with refractive power is ΣCT, an axial distance between an object-side surface of a lens element closest to an object and an image-side surface of a lens element closest to an image surface is TD, a curvature radius of the object-side surface of the lens element closest to the object is R1, a curvature radius of the image-side surface of the lens element closest to the image surface is Rlast, and an axial distance between the object-side surface of the lens element closest to the object and the image surface is TL, the following conditions are satisfied:

0.00 nm<(λt50−400 nm)×(500 nm−λt50)/λt50<5.55 nm;

0.50<ΣCT/TD<0.90;

0<R1/Rlast<3.0; and

TL<8.5 mm.

According to yet another aspect of the present disclosure, an image capturing unit includes the photographing optical lens assembly according to the aforementioned aspect and an image sensor, wherein an image sensor is disposed on the image surface of the photographing optical lens assembly, and a resolution of the image sensor is greater than or equal to ten million pixels.

According to yet another aspect of the present disclosure, an image capturing unit includes the photographing optical lens assembly according to the aforementioned aspect and an optical image stabilization (OIS) element, wherein the optical image stabilization element is connected with the photographing optical lens assembly.

According to yet another aspect of the present disclosure, a photographing optical lens assembly includes at least five lens elements. The lens elements have refractive power, and an object-side surface and an image-side surface of each of the lens elements are aspheric. At least one of the object-side surface and the image-side surface of at least one of the lens elements has at least one inflection point. There is an air space between every two lens elements adjacent to each other. When a wavelength correspondent to a 50% transmittance of the photographing optical lens assembly is λt50, an average transmittance of the photographing optical lens assembly in a wavelength range of 400 nm to 450 nm is Tavg400~450, a sum of central thicknesses of the lens elements with refractive power is ΣCT, an axial distance between an object-side surface of a lens element closest to an object and an image-side surface of a lens element closest to an image surface is TD, and an axial distance between the object-side surface of the lens element closest to the object and the image surface is TL, the following conditions are satisfied:

0.00 nm<(λt50−400 nm)×(500 nm−λt50)/λt50<5.55 nm;

30%<Tavg400~450<60%;

0.50<ΣCT/TD<0.90; and

TL<8.5 mm.

According to yet another aspect of the present disclosure, an electronic device includes at least two image capturing units. Each of the image capturing unit includes the photographing optical lens assembly according to the aforementioned aspect and an image sensor, wherein the image sensor is disposed on the image surface of the photographing optical lens assembly.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
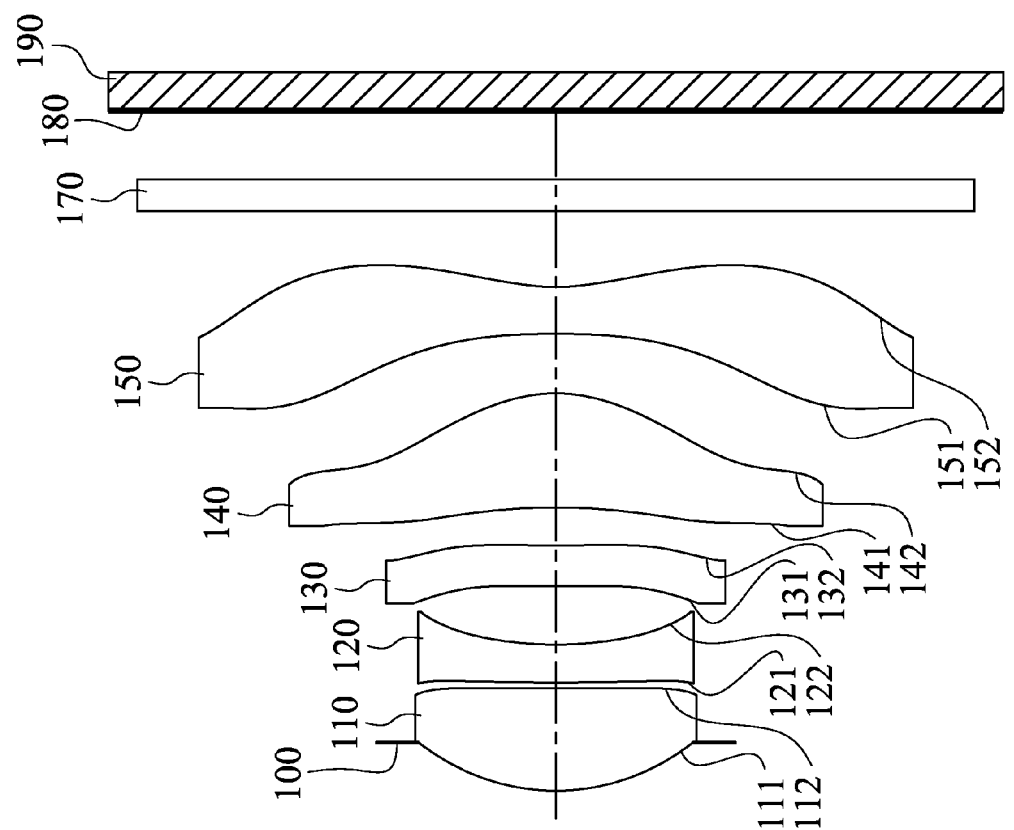
FIG. 1 is a schematic view of an image capturing unit according to the 1st embodiment of the present disclosure.

A photographing optical lens assembly includes at least five lens elements with refractive power.

When the photographing optical lens assembly has a total of five lens elements with refractive power, the five lens elements are, in order from an object side to an image side, a first lens element, a second lens element, a third lens element, a fourth lens element and a fifth lens element. When the photographing optical lens assembly has a total of six lens elements with refractive power, the six lens elements are, in order from an object side to an image side, a first lens element, a second lens element, a third lens element, a fourth lens element, a fifth lens element and a six lens element. When the total number of the lens elements with refractive power of the photographing optical lens assembly is more than six, the lens elements are named in a similar fashion.

There is an air space between every two lens elements adjacent to each other. That is, the photographing optical lens assembly includes at least five lens elements, each of which is a single and non-cemented lens element, any two lens elements adjacent to each other are not cemented, and there is a space between the two lens elements. In other words, of the lens elements of the photographing optical lens assembly, there is a space in a paraxial region between every pair of lens elements that are adjacent to each other. Moreover, the manufacturing process of the cemented lenses is more complex than the non-cemented lenses. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the photographing optical lens assembly. Therefore, according to the photographing optical lens assembly of the present disclosure, an air space in a paraxial region between any two of the lens elements that are adjacent to each other improves the problem generated by the cemented lens elements.

At least one of an object-side surface and an image-side surface of at least one of the lens elements has at least one inflection point. For example, when the photographing optical lens assembly has a total of five lens elements with refractive power, at least one of the first lens element, the second lens element, the third lens element, the fourth lens element and the fifth lens element has at least one inflection point formed on an object-side surface and/or an image-side surface thereof. Therefore, the aberration of the off-axis field can be corrected, and the image quality at the periphery of the image can be improved.

When the photographing optical lens assembly has a total of five lens elements with refractive power, the first lens element with positive refractive power has a convex object-side surface. Therefore, the light converging ability of the first lens element can be enhanced, which is favorable for reducing the total track length of the photographing optical lens assembly. The second lens element with negative refractive power can have a concave image-side surface. Therefore, the aberration generated from the first lens element can be effectively corrected, and the image quality can be improved. The third lens element can have positive or negative refractive power. When the third lens element has positive refractive power, the sensitivity of refractive power distribution of the photographing optical lens assembly can be reduced. When the third lens element has negative refractive power, which is favorable for reducing the refractive power of the second lens element, and the excessive aberration can be avoided. The fourth lens element can have positive or negative refractive power. When the fourth lens element has positive refractive power, the back focal length of the photographing optical lens assembly can be reduced. When the fourth lens element has negative refractive power, the ability for correcting chromatic aberration can be enhanced. The fourth lens element has a convex image-side surface. Therefore, the astigmatism can be corrected. The fifth lens element has negative refractive power, which can effectively control the total track length of the photographing optical lens assembly. The fifth lens element has a convex object-side surface and a concave image-side surface. Therefore, the back focal length of the photographing optical lens assembly can be controlled, and the compact size can be maintained. At least one of the object-side surface and the image-side surface of the fifth lens element has at least one inflection point. Therefore, the aberration of the off-axis field can be corrected so as to obtain an excellent image quality.

When the photographing optical lens assembly has a total of six lens elements with refractive power, the first lens element with positive refractive power has a convex object-side surface. Therefore, the light converging ability of the first lens element can be enhanced, which is favorable for reducing the total track length of the photographing optical lens assembly. The second lens element has negative refractive power. Therefore, the aberration of the photographing optical lens assembly can be effectively corrected, and the image quality can be improved. The fourth lens element has negative refractive power, which is favorable for correcting the aberration of the photographing optical lens assembly. The fourth lens element has a concave object-side surface and a convex image-side surface. Therefore, the principal point of the photographing optical lens assembly can be positioned away from the image side so as to effectively control the back focal length thereof, and the compact size can be maintained. The fifth lens element has positive refractive power. Therefore, the distribution of the positive refractive power of the photographing optical lens assembly can be balanced so as to reduce the sensitivity of refractive power distribution thereof. The fifth lens element has a convex object-side surface and a concave image-side surface. Therefore, the astigmatism of the photographing optical lens assembly can be effectively corrected. The sixth lens element with negative refractive power has a concave image-side surface. Therefore, the back focal length of the photographing optical lens assembly can be controlled, and the compact size can be maintained. At least one of an object-side surface and the image-side surface of the six lens element has at least one inflection point. Therefore, the aberration of the off-axis field can be corrected so as to obtain an excellent image quality.

When a wavelength correspondent to a 50% transmittance of the photographing optical lens assembly is $\lambda t50$, the following condition is satisfied: $0.00 \text{ nm} < (\lambda t50 - 400 \text{ nm}) \times (500 \text{ nm} - \lambda t50)/\lambda t50 < 5.55 \text{ nm}$. Therefore, the unnecessary light which is excessively intensified by the image sensor can be filtered. Accordingly, the shooting image is more natural, and the unnecessary blue and violet light generated at the periphery of the image can be prevented. Preferably, the following condition can be satisfied: $3.50 \text{ nm} < (\lambda t50 - 400 \text{ nm}) \times (500 \text{ nm} - \lambda t50)/\lambda t50 < 5.55 \text{ nm}$. More preferably, the following condition can be satisfied: $4.00 \text{ nm} < (\lambda t50 - 400 \text{ nm}) \times (500 \text{ nm} - \lambda t50)/\lambda t50 < 5.55 \text{ nm}$.

According to the photographing optical lens assembly of the present disclosure, when a sum of central thicknesses of the lens elements with refractive power is $\Sigma CT$ (For example, when the photographing optical lens assembly has a total of five lens elements with refractive power, a sum of a central thickness of the first lens element, a central thickness of the second lens element, a central thickness of the third lens element, a central thickness of the fourth lens element and a central thickness of the fifth lens element is $\Sigma CT$. For another example, when the photographing optical lens assembly has a total of six lens elements with refractive power, a sum of a central thickness of the first lens element, a central thickness of the second lens element, a central thickness of the third lens element, a central thickness of the fourth lens element, a central thickness of the fifth lens element and a central thickness of the sixth lens element is $\Sigma CT$; and so on), and an axial distance between an object-side surface of a lens element closest to an object and an image-side surface of a lens element closest to an image surface is TD, the following condition is satisfied: $0.50 < \Sigma CT/TD < 0.90$. Therefore, the space can be used efficiently, and the total track length of the photographing optical lens assembly can be reduced so as to maintain a compact size.

According to the photographing optical lens assembly of the present disclosure, when a curvature radius of the object-side surface of the lens element closest to the object is R1, and a curvature radius of the image-side surface of the lens element closest to the image surface is Rlast, the following condition can be satisfied: $0 < R1/Rlast < 3.0$. Therefore, the back focal length of the photographing optical lens assembly can be reduced, and a compact size can be obtained.

According to the photographing optical lens assembly of the present disclosure, when an axial distance between the object-side surface of the lens element closest to the object and the image surface is TL, the following condition can be satisfied: $TL < 8.5 \text{ mm}$. Therefore, it is favorable for maintaining a compact size of the photographing optical lens assembly. Preferably, the following condition can be satisfied: $TL < 6.5 \text{ mm}$.

The photographing optical lens assembly can further include a stop, such as an aperture stop. When an axial distance between the stop and the image-side surface of the lens element closest to the image surface is SD, and the axial distance between the object-side surface of the lens element closest to the object and the image-side surface of the lens element closest to the image surface is TD, the following condition can be satisfied: $0.65 < SD/TD < 1.0$. Therefore, the telecentricity and the wide-angle character of the photographing optical lens assembly can be balanced.

When an average transmittance of the photographing optical lens assembly in a wavelength range of 410 nm to 430 nm is Tavg410~430, the following condition can be satisfied: $45\% < \text{Tavg410~430} < 55\%$. Therefore, the transmittance in a wavelength range of 410 nm to 430 nm can be specifically restricted, and the distribution thereof is more symmetric and regular. Accordingly, the image quality can be improved.

When a wavelength correspondent to a 30% transmittance of the photographing optical lens assembly is $\lambda t30$, the wavelength correspondent to the 50% transmittance of the photographing optical lens assembly is $\lambda t50$, and a wavelength correspondent to a 70% transmittance of the photographing optical lens assembly is $\lambda t70$, the following condition can be satisfied: $0.00 \text{ nm} < (\lambda t70 - 420 \text{ nm}) \times (420 \text{ nm} - \lambda t30)/\lambda t50 < 15.00 \text{ nm}$. Therefore, the transmitting energy of different wavelength ranges can be efficiently distributed, and is thus more suitable for the responding range of the image sensor.

The photographing optical lens assembly can further include at least one short wavelength cut filter disposed at an optical path between the object and the image surface. The short wavelength cut filter can be the lens element with refractive power or a flat element, such as an IR-cut filter, of the photographing optical lens assembly. The short wavelength cut filter can include at least one coating layer or can be made of material which can absorb light with a short wavelength. The short wavelength cut filter can absorb or reflect the light with a short wavelength so as to filter out the light with the short wavelength. The aforementioned term "short wavelength" is a wavelength within the range of 400 nm to 450 nm. Specifically, the "short wavelength cut filter" according to the present disclosure is an element whose transmittance for a wavelength of 420 nm is less than 50%. The aforementioned coating layer can be coated on at least one surface of the short wavelength cut filter, and the coating layer can be formed by a plurality of titanium dioxide ($TiO_2$) films and a plurality of silicon dioxide ($SiO_2$) which are alternately stacked. The short wavelength cut filter can also made of material which can absorb light with a short wavelength, or the aforementioned material can be dealt with heat treatment or added with other material so as to change the transmittance thereof for light with a short wavelength.

According to the photographing optical lens assembly of the present disclosure, at least one of the lens elements is a short wavelength cut filter by absorption or by reflection, i.e., the short wavelength cut filter can absorb light with a short wavelength by absorption or by reflection. Therefore, the components of the photographing optical lens assembly can be reduced while enabling the photographing optical lens assembly to filter light with a short wavelength.

According to the photographing optical lens assembly of the present disclosure, when a maximum of refractive indexes of the lens elements with refractive power is Nmax, the following condition can be satisfied: $1.50 < Nmax < 1.70$. Therefore, the cost can be effectively reduced, and it is favorable for enhancing the moldability of the lens elements.

According to the photographing optical lens assembly of the present disclosure, when an Abbe number of the first lens element is V1, an Abbe number of the second lens element is V2, and an Abbe number of the fourth lens element is V4, the following condition can be satisfied: $0.5<(V2+V4)/V1<1.0$. Therefore, the chromatic aberration of the photographing optical lens assembly can be corrected.

According to the photographing optical lens assembly of the present disclosure, when a minimum of central thicknesses of the lens elements with refractive power is CTmin, the following condition can be satisfied: $CTmin<0.30$ mm. Therefore, it is favorable for reducing the total track length of the photographing optical lens assembly.

According to the photographing optical lens assembly of the present disclosure, when an average transmittance of the photographing optical lens assembly in a wavelength range of 390 nm to 410 nm is Tavg390~410, the following condition can be satisfied: $Tavg390~410<30\%$. Therefore, the responding wavelength range of the image sensor and the visible wavelength range can be balanced, and the unnecessary noise can be avoided.

When a focal length of the photographing optical lens assembly is f, and an entrance pupil diameter of the photographing optical lens assembly is EPD, the following condition can be satisfied: $f/EPD<2.4$. Therefore, the size of the stop can be favorably controlled, and the light rays entering into the photographing optical lens assembly can be increased.

When the axial distance between the object-side surface of the lens element closest to the object and the image surface is TL, and a maximum image height of the photographing optical lens assembly is ImgH (i.e., half of a diagonal length of an effective photosensitive area of the image sensor), the following condition can be satisfied: $1.0<TL/ImgH<2.0$. Therefore, a larger image can be obtained within a limited space, and the receiving area of light can be increased.

When an average transmittance of the photographing optical lens assembly in a wavelength range of 400 nm to 450 nm is Tavg400~450, the following condition can be satisfied: $30\%<Tavg400~450<60\%$. Therefore, the unnecessary energy band can be controlled, and the wavelength range which cannot be identified by human eyes but can be resolved and presented by the image sensor can be blocked. Preferably, the following condition can be satisfied: $40\%<Tavg400~450<60\%$.

When a half of a maximal field of view of the photographing optical lens assembly is HFOV, the following condition can be satisfied: $0.70<\tan(HFOV)<1.20$. Therefore, the field of view and the imaging range are proper.

According to the photographing optical lens assembly of the present disclosure, when the photographing optical lens assembly has a total of five lens elements with refractive power, the lens element closest to the object is the first lens element, and the lens element closest to the image surface is the fifth lens element; when the photographing optical lens assembly has a total of six lens elements with refractive power, the lens element closest to the object is the first lens element, and the lens element closest to the image surface is the sixth lens element; and so on. According to the photographing optical lens assembly of the present disclosure, the lens elements thereof can be made of glass or plastic material. When the lens elements are made of plastic material, the manufacturing cost can be effectively reduced. When the lens elements are made of glass material, the distribution of the refractive powers of the photographing optical lens assembly may be more flexible to design. Furthermore, the object-side surfaces and the image-side surfaces of all the lens elements with refractive power of the photographing optical lens assembly are arranged to be aspheric (ASP), since the aspheric surface of the lens element is easy to form a shape other than spherical surface so as to have more controllable variables for eliminating the aberration thereof, and to further decrease the required number of the lens elements. Therefore, the total track length of the photographing optical lens assembly can also be reduced.

According to the photographing optical lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, if not stated otherwise, when the lens element has a convex surface, it indicates that the surface is convex in the paraxial region thereof; when the lens element has a concave surface, it indicates that the surface is concave in the paraxial region thereof. According to the photographing optical lens assembly of the present disclosure, the positive refractive power or the negative refractive power of a lens element or the focal length of the lens element, that is, refers to the refractive power or the focal length in the paraxial region of the lens element.

According to the photographing optical lens assembly of the present disclosure, the image surface of the photographing optical lens assembly, based on the corresponding image sensor, can be flat or curved. In particular, the image surface can be a curved surface being concave facing towards the object side.

According to the photographing optical lens assembly of the present disclosure, the photographing optical lens assembly can include at least one stop, such as an aperture stop, a glare stop or a field stop. Said glare stop or said field stop is for eliminating the stray light and thereby improving the image resolution thereof.

According to the photographing optical lens assembly of the present disclosure, an aperture stop can be configured as a front stop or a middle stop. The front stop disposed between an imaged object and the first lens element can provide a longer distance between an exit pupil of the photographing optical lens assembly and the image surface and thereby improves the image-sensing efficiency of an image sensor. A middle stop disposed between the first lens element and the image surface is favorable for enlarging the field of view of the photographing optical lens assembly and thereby provides a wider field of view for the same.

According to the photographing optical lens assembly of the present disclosure, the photographing optical lens assembly can be optionally applied to moving focus optical systems, and is featured with good ability for correcting aberration and high image quality. The photographing optical lens assembly of the present disclosure also can be applied to 3D (three-dimensional) image capturing applications, in products such as digital cameras, mobile devices, digital tablets, smart TV, internet monitoring device, game consoles with motion sensing function, driving recording systems, rear view camera systems, and wearable devices.

According to the present disclosure, an image capturing unit is provided. The image capturing unit includes the aforementioned photographing optical lens assembly and an image sensor, wherein the image sensor is disposed at the image side of the aforementioned photographing optical lens assembly, that is, the image sensor can be disposed on or near the image surface of the aforementioned photographing optical lens assembly. The photographing optical lens assembly can filter out the unnecessary light which is excessively intensified by the image sensor, so that the shooting image is more natural, and the unnecessary blue and violet light generated at the periphery of the image can be prevented. Furthermore, the space can be used efficiently, and the total track length of the photographing optical lens assembly can be reduced so as to maintain a compact size. Accordingly, the image quality of the image capturing unit can be improved, and a compact size thereof can be maintained. Moreover, when a side length of a pixel of the image sensor is Lth, the following condition can be satisfied: Lth<1.6 µm. A resolution of the image sensor can be greater than or equal to ten million pixels. Therefore, the finesse and the resolution of the image of the image capturing unit can be enhanced, and the image quality is improved thereby.

According to the present disclosure, another image capturing unit is provided. The image capturing unit includes the aforementioned photographing optical lens assembly and an optical image stabilization element, wherein the optical image stabilization element is connected with the photographing optical lens assembly. The photographing optical lens assembly can filter out the unnecessary light which is excessively intensified by the image sensor, so that the shooting image is more natural, and the unnecessary blue and violet light generated at the periphery of the image can be prevented. Furthermore, the space can be used efficiently, and the total track length of the photographing optical lens assembly can be reduced so as to maintain a compact size. Accordingly, the image quality of the image capturing unit can be improved, and a compact size thereof can be maintained. The optical image stabilization element can compensate the offset caused by the shake during exposure process, so that the image blur can be prevented, and the image sharpness can be enhanced. Accordingly, the photographing quality can be improved.

Preferably, the aforementioned image capturing unit can further include a barrel member, a holding member or a combination thereof.

According to the present disclosure, an electronic device is provided. The electronic device can include at least two aforementioned image capturing unit. Therefore, more diverse applications can be provided while maintaining a compact size and increasing the pixels of the image, and the shooting image is more natural. Preferably, the electronic device can further include but not limited to a control unit, a display, a storage unit, a random access memory unit (RAM), a read only memory unit (ROM) or a combination thereof.

According to the above description of the present disclosure, the following specific embodiments and examples are provided for further explanation.

1st Embodiment

FIG. 1 is a schematic view of an image capturing unit according to the 1st embodiment of the present disclosure. In FIG. 1, the image capturing unit includes a photographing optical lens assembly (its reference numeral is omitted) and an image sensor 190. The photographing optical lens assembly includes, in order from an object side to an image side, an aperture stop 100, a first lens element 110, a second lens element 120, a third lens element 130, a fourth lens element 140, a fifth lens element 150, an IR-cut filter 170 and an image surface 180, wherein the image sensor 190 is disposed on the image surface 180 of the photographing optical lens assembly. The photographing optical lens assembly has a total of five lens elements (110-150) with refractive power. There is an air space between any two of the first lens element 110, the second lens element 120, the third lens element 130, the fourth lens element 140 and the fifth lens element 150 that are adjacent to each other.

The first lens element 110 with positive refractive power has a convex object-side surface 111 and a concave image-side surface 112. The first lens element 110 is made of plastic material and has the object-side surface 111 and the image-side surface 112 being both aspheric. Furthermore, the object-side surface 111 and the image-side surface 112 of the first lens element 110 both have at least one inflection point.

The second lens element 120 with negative refractive power has a convex object-side surface 121 and a concave image-side surface 122. The second lens element 120 is made of plastic material and has the object-side surface 121 and the image-side surface 122 being both aspheric. Furthermore, the object-side surface 121 of the second lens element 120 has at least one inflection point.

The third lens element 130 with negative refractive power has a convex object-side surface 131 and a concave image-side surface 132. The third lens element 130 is made of plastic material and has the object-side surface 131 and the image-side surface 132 being both aspheric. Furthermore, the object-side surface 131 and the image-side surface 132 of the third lens element 130 both have at least one inflection point.

The fourth lens element 140 with positive refractive power has a concave object-side surface 141 and a convex image-side surface 142. The fourth lens element 140 is made of plastic material and has the object-side surface 141 and the image-side surface 142 being both aspheric. Furthermore, the object-side surface 141 and the image-side surface 142 of the fourth lens element 140 both have at least one inflection point.

The fifth lens element 150 with negative refractive power has a concave object-side surface 151 and a concave image-side surface 152. The fifth lens element 150 is made of plastic material and has the object-side surface 151 and the image-side surface 152 being both aspheric. Furthermore, the object-side surface 151 and the image-side surface 152 of the fifth lens element 150 both have at least one inflection point.

The IR-cut filter 170 is made of glass material and disposed between the fifth lens element 150 and the image surface 180, and will not affect a focal length of the photographing optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing optical lens assembly according to the 1st embodiment, when a focal length of the photographing optical lens assembly is f, an f-number of the photographing optical lens assembly is Fno, and half of a maximal field of view of the photographing optical lens assembly is HFOV, these parameters have the following values: f=3.74 mm; Fno=2.06; and HFOV=37.6 degrees.

In the photographing optical lens assembly according to the 1st embodiment, when a maximum of refractive indexes of the lens elements (110-150) with refractive power is Nmax (in the 1st embodiment, Nmax is the index of the second lens element 120 and the index of the third lens element 130), the parameter has the following value: Nmax=1.639.

In the photographing optical lens assembly according to the 1st embodiment, when an Abbe number of the first lens element 110 is V1, an Abbe number of the second lens element 120 is V2, and an Abbe number of the fourth lens element 140 is V4, the following condition is satisfied: (V2+V4)/V1=1.420.

In the photographing optical lens assembly according to the 1st embodiment, when a minimum of central thicknesses of the lens elements (110-150) with refractive power is CTmin (in the 1st embodiment, CTmin is the central thickness of the second lens element 120), the parameter has the following value: CTmin=0.250 mm.

In the photographing optical lens assembly according to the 1st embodiment, when a curvature radius of the object-side surface of the lens element closest to the object (i.e. the object-side surface 111 of the first lens element 110) is R1, and a curvature radius of the image-side surface of the lens element closest to the image surface 180 (i.e. the image-side surface 152 of the fifth lens element 150) is Rlast, the following condition is satisfied: R1/Rlast=1.0.

In the photographing optical lens assembly according to the 1st embodiment, when a sum of central thicknesses of the lens elements (110-150) with refractive power is ΣCT, and an axial distance between the object-side surface of the lens element closest to the object (i.e. the object-side surface 111 of the first lens element 110) and the image-side surface of the lens element closest to the image surface 180 (i.e. the image-side surface 152 of the fifth lens element 150) is TD, the following condition is satisfied: ΣCT/TD=0.68. In the photographing optical lens assembly according to the 1st embodiment, when an axial distance between the aperture stop 100 and the image-side surface of the lens element closest to the image surface 180 (i.e. the image-side surface 152 of the fifth lens element 150) is SD, and the axial distance between the object-side surface of the lens element closest to the object (i.e. the object-side surface 111 of the first lens element 110) and the image-side surface of the lens element closest to the image surface 180 (i.e. the image-side surface 152 of the fifth lens element 150) is TD, the following condition is satisfied: SD/TD=0.90.

In the photographing optical lens assembly according to the 1st embodiment, when the focal length of the photographing optical lens assembly is f, and an entrance pupil diameter of the photographing optical lens assembly is EPD, the following condition is satisfied: f/EPD=2.06.

In the photographing optical lens assembly according to the 1st embodiment, when an axial distance between the object-side surface of the lens element closest to the object (i.e. the object-side surface 111 of the first lens element 110) and the image surface 180 is TL, the parameter has the following value: TL=4.49 mm.

In the photographing optical lens assembly according to the 1st embodiment, when the axial distance between the object-side surface of the lens element closest to the object (i.e. the object-side surface 111 of the first lens element 110) and the image surface 180 is TL, and a maximum image height of the photographing optical lens assembly is ImgH, the following condition is satisfied: TL/ImgH=1.53.

In the photographing optical lens assembly according to the 1st embodiment, when a half of the maximal field of view of the photographing optical lens assembly is HFOV, the following condition is satisfied: tan(HFOV)=0.77.

In the photographing optical lens assembly according to the 1st embodiment, when a side length of a pixel of the image sensor 190 is Lth, the parameter has the following value: Lth=1.12 μm. Moreover, a resolution of the image sensor 190 is equal to thirteen million pixels.

The detailed optical data of the 1st embodiment are shown in Table 1 and the aspheric surface data are shown in Table 2 below.

TABLE 1

1st Embodiment
f = 3.74 mm, Fno = 2.06, HFOV = 37.6 deg.

| Surface # | | Curvature Radius | Thickness | | Material | Index | Abbe # | Focal Length |
|---|---|---|---|---|---|---|---|---|
| 0 | Object | Plano | | Infinity | | | | |
| 1 | Ape. Stop | Plano | | −0.317 | | | | |
| 2 | Lens 1 | 1.441 | ASP | 0.677 | Plastic | 1.544 | 55.9 | 2.89 |
| 3 | | 14.495 | ASP | 0.037 | | | | |
| 4 | Lens 2 | 7.530 | ASP | 0.250 | Plastic | 1.639 | 23.5 | −5.38 |
| 5 | | 2.330 | ASP | 0.385 | | | | |
| 6 | Lens 3 | 10.837 | ASP | 0.270 | Plastic | 1.639 | 23.5 | −92.76 |
| 7 | | 9.073 | ASP | 0.251 | | | | |
| 8 | Lens 4 | −4.374 | ASP | 0.753 | Plastic | 1.544 | 55.9 | 2.31 |
| 9 | | −1.036 | ASP | 0.393 | | | | |
| 10 | Lens 5 | −6.757 | ASP | 0.309 | Plastic | 1.544 | 55.9 | −2.16 |
| 11 | | 1.446 | ASP | 0.500 | | | | |
| 12 | IR-cut filter | Plano | | 0.210 | Glass | 1.517 | 64.2 | — |
| 13 | | Plano | | 0.455 | | | | |
| 14 | Image | Plano | | — | | | | |

Note:
Reference wavelength is 587.6 nm (d-line).

TABLE 2

| Aspheric Coefficients | | | | | |
|---|---|---|---|---|---|
| Surface # | 2 | 3 | 4 | 5 | 6 |
| k = | −4.3940E+00 | −1.4812E+01 | −4.8583E+01 | −1.7428E+01 | −3.3227E+00 |
| A4 = | 1.8141E−01 | −2.8851E−01 | −3.5954E−01 | 4.1942E−02 | −2.9512E−01 |
| A6 = | −9.3665E−02 | 8.9710E−01 | 1.2212E+00 | 2.5207E−01 | 1.9462E−01 |
| A8 = | 1.6431E−01 | −1.1693E+00 | −1.7771E+00 | −1.7041E−01 | −3.6206E−01 |
| A10 = | −3.5183E−01 | 3.3751E−01 | 1.0608E+00 | −1.3611E−01 | 4.5648E−01 |
| A12 = | 4.6190E−01 | 3.0442E−01 | −2.4494E−01 | 2.1872E−01 | −1.7700E−01 |
| A14 = | −2.4315E−01 | −2.1500E−01 | | | 8.0172E−03 |

| Surface # | 7 | 8 | 9 | 10 | 11 |
|---|---|---|---|---|---|
| k = | −4.3086E+01 | −2.0953E+00 | −2.5465E+00 | 9.3168E−01 | −9.8572E+00 |
| A4 = | −2.3886E−01 | −5.4352E−02 | −2.5219E−02 | −1.6629E−01 | −1.1859E−01 |
| A6 = | 1.8504E−01 | 1.0867E−01 | −1.8432E−02 | 1.5960E−01 | 7.5663E−02 |
| A8 = | −2.3038E−01 | −3.7278E−02 | 7.0124E−02 | −1.0975E−01 | −3.8492E−02 |
| A10 = | 2.1156E−01 | −2.6711E−03 | −1.9049E−02 | 4.8048E−02 | 1.2330E−02 |
| A12 = | −6.8044E−02 | 3.0561E−03 | −8.8239E−03 | −1.1787E−02 | −2.3884E−03 |
| A14 = | 5.5731E−03 | −3.9999E−04 | 4.6844E−03 | 1.4916E−03 | 2.5424E−04 |
| A16 = | | | −5.8551E−04 | −7.6309E−05 | −1.1222E−05 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

In the photographing optical lens assembly according to the 1st embodiment, when a wavelength correspondent to a 30% transmittance of the photographing optical lens assembly is λt30, a wavelength correspondent to a 50% transmittance of the photographing optical lens assembly is λt50, and a wavelength correspondent to a 70% transmittance of the photographing optical lens assembly is λt70, the following conditions are satisfied: 0.00 nm<(λt50−400 nm)×(500 nm−λt50)/λt50<5.55 nm; and 0.00 nm (λt70−420 nm)×(420 nm−λt30)/λt50<15.00 nm.

In the photographing optical lens assembly according to the 1st embodiment, when an average transmittance of the photographing optical lens assembly in a wavelength range of 390 nm to 410 nm is Tavg390~410, an average transmittance of the photographing optical lens assembly in a wavelength range of 410 nm to 430 nm is Tavg410~430, and an average transmittance of the photographing optical lens assembly in a wavelength range of 400 nm to 450 nm is Tavg400~450, the following conditions are satisfied: Tavg390~410<30%; 45%<Tavg410~430<55%; and 30%<Tavg400~450<60%.

Figure 2:
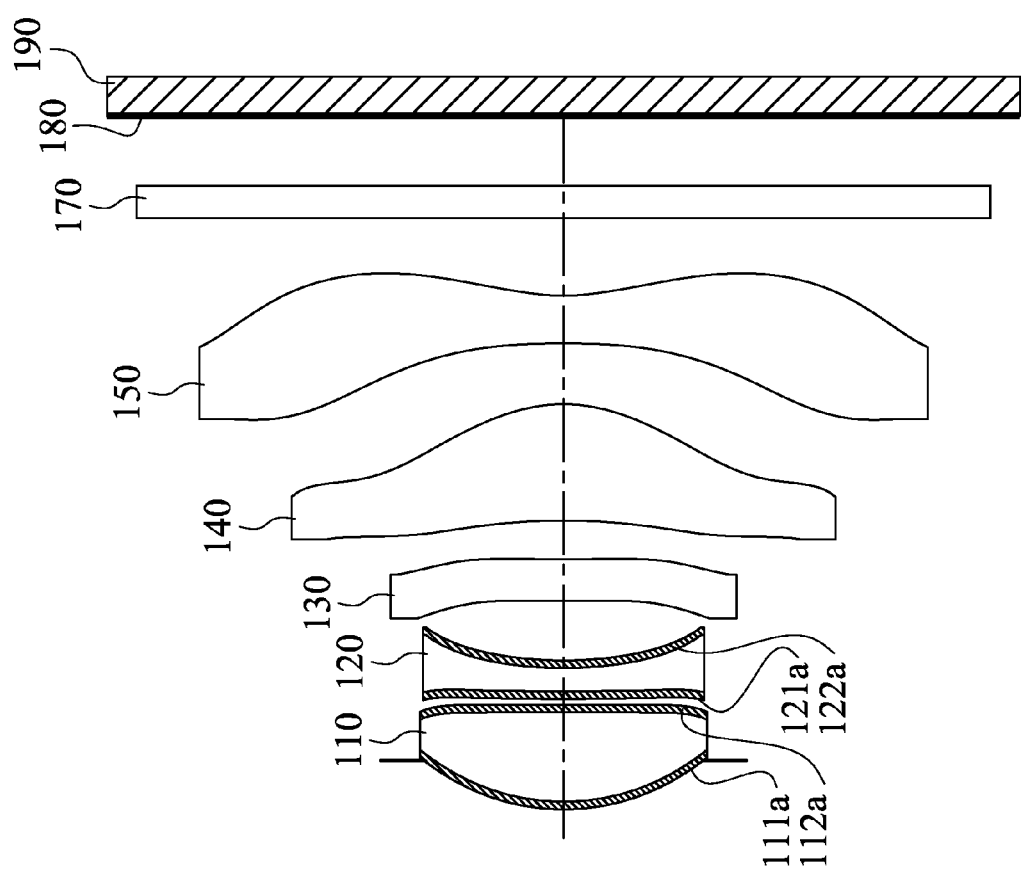
FIG. 2 shows a schematic view of one arrangement of short wavelength cut filters according to the 1st example of the image capturing unit in FIG. 1.

FIG. 2 shows a schematic view of one arrangement of short wavelength cut filters according to the 1st example of the image capturing unit in FIG. 1. In FIG. 2, the photographing optical lens assembly includes two short wavelength cut filters, the first lens element 110 and the second lens element 120. The first lens element 110 has a coating layer 111a formed on the object-side surface 111 and a coating layer 112a formed on the image-side surface 112. The second lens element 120 has a coating layer 121a formed on the object-side surface 121 and a coating layer 122a formed on the image-side surface 122. Furthermore, the aforementioned short wavelength cut filters (110, 120) are disposed at an optical path between the object and the image surface 180.

Figure 12:
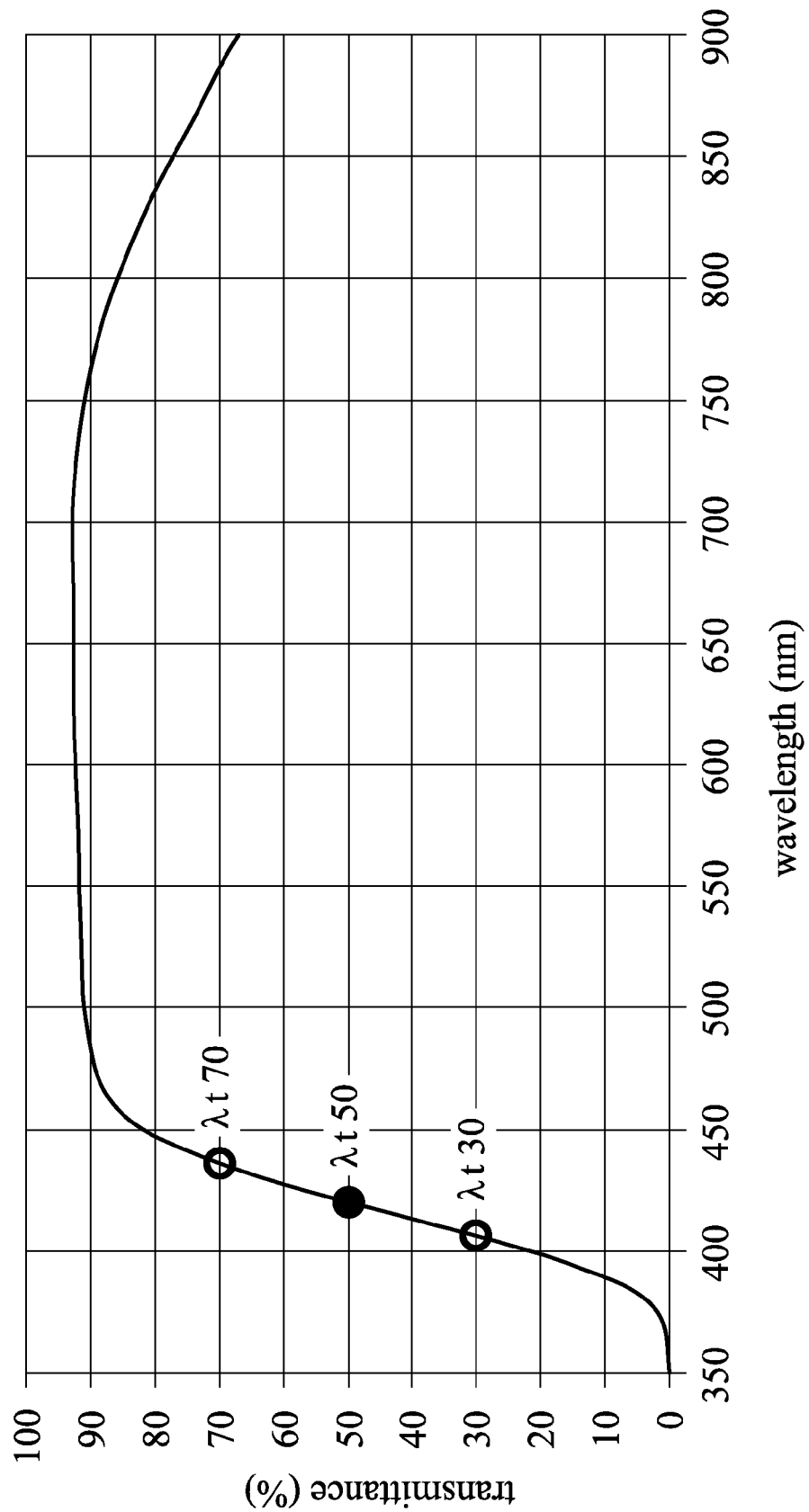
FIG. 12 shows the relationship between the transmittance and the wavelength of the photographing optical lens assembly in FIG. 2.

FIG. 12 shows the relationship between the transmittance and the wavelength of the photographing optical lens assembly in FIG. 2. In FIG. 12, when the wavelength correspondent to the 30% transmittance of the photographing optical lens assembly is λt30, the wavelength correspondent to the 50% transmittance of the photographing optical lens assembly is λt50, and the wavelength correspondent to the 70% transmittance of the photographing optical lens assembly is λt70, these parameters have the following values: λt30=407.00 nm; λt50=421.00 nm; λt70=437.00 nm; and the following conditions are satisfied: (λt50−400 nm)×(500 nm−λt50)/λt50=3.94 nm; and (λt70−420 nm)×(420 nm−λt30)/λt50=0.52 nm.

Furthermore, as shown in FIG. 12, when the average transmittance of the photographing optical lens assembly in the wavelength range of 390 nm to 410 nm is Tavg390~410, the average transmittance of the photographing optical lens assembly in the wavelength range of 410 nm to 430 nm is Tavg410~430, and the average transmittance of the photographing optical lens assembly in the wavelength range of 400 nm to 450 nm is Tavg400~450, these parameters have the following values: Tavg390~410=21.89%; Tavg410~430=49.2%; and Tavg400~450=54.47%.

Figure 3:
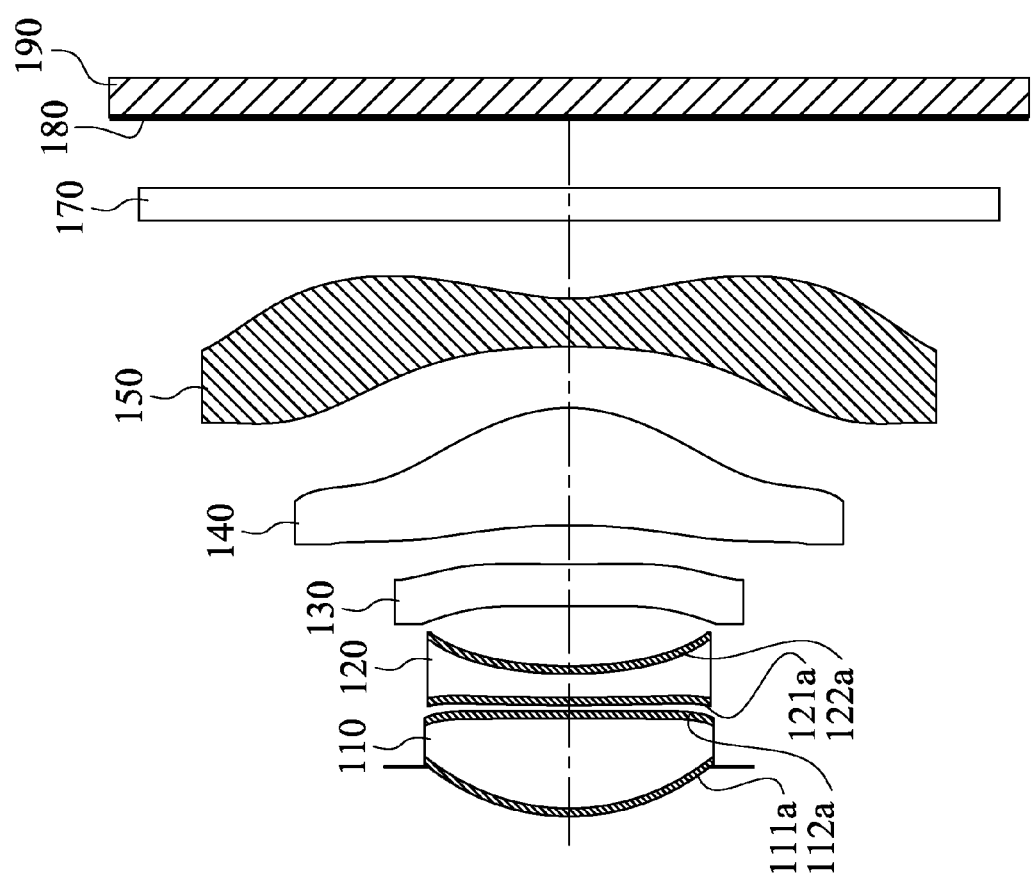
FIG. 3 shows a schematic view of one arrangement of short wavelength cut filters according to the 2nd example of the image capturing unit in FIG. 1.

FIG. 3 shows a schematic view of one arrangement of short wavelength cut filters according to the 2nd example of the image capturing unit in FIG. 1. In FIG. 3, the photographing optical lens assembly includes three short wavelength cut filters, the first lens element 110, the second lens element 120 and the fifth lens element 150. The first lens element 110 has a coating layer 111a formed on the object-side surface 111 and a coating layer 112a formed on the image-side surface 112. The second lens element 120 has a coating layer 121a formed on the object-side surface 121 and a coating layer 122a formed on the image-side surface 122. The fifth lens element 150 is made of material which can absorb light with a short wavelength. Furthermore, the aforementioned short wavelength cut filters (110, 120, 150) are disposed at an optical path between the object and the image surface 180.

Figure 4:
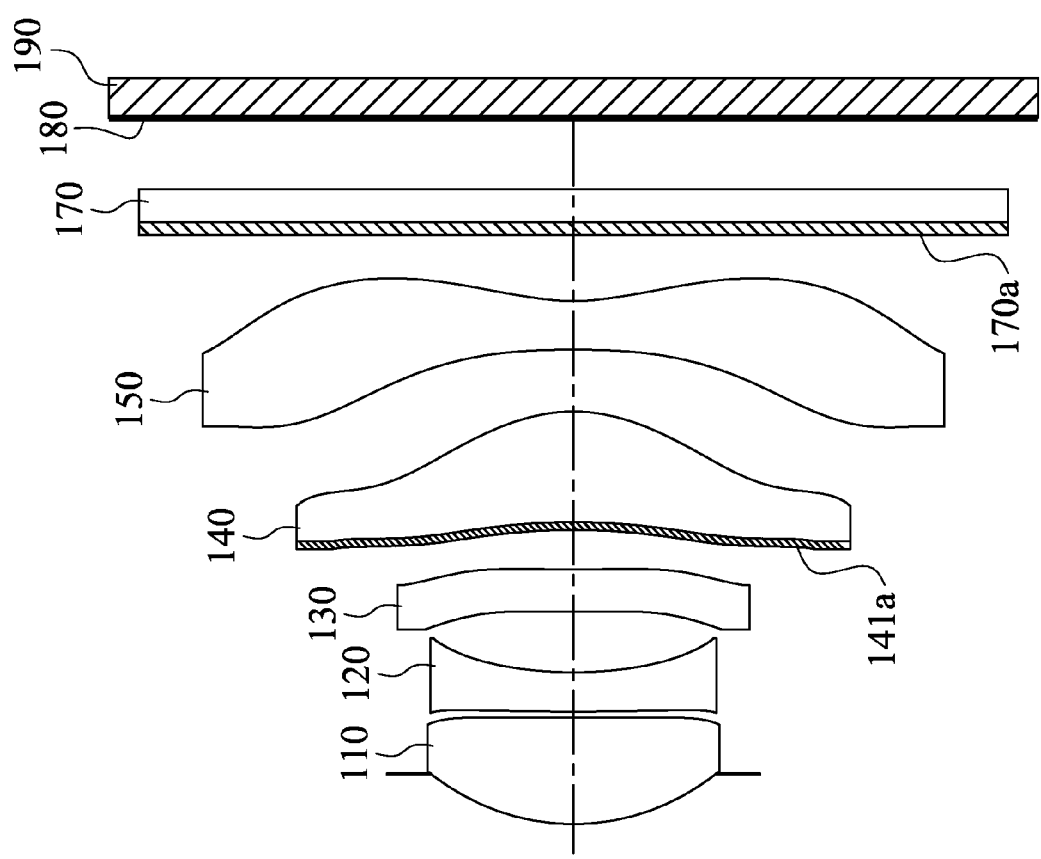
FIG. 4 shows a schematic view of one arrangement of short wavelength cut filters according to the 3rd example of the image capturing unit in FIG. 1.

FIG. 4 shows a schematic view of one arrangement of short wavelength cut filters according to the 3rd example of the image capturing unit in FIG. 1. In FIG. 4, the photographing optical lens assembly includes two short wavelength cut filters, the fourth lens element 140 and the IR-cut filter 170. The fourth lens element 140 has a coating layer 141a formed on the object-side surface 141. The IR-cut filter 170 has a coating layer 170a formed on the surface facing the object. Furthermore, the aforementioned short wavelength cut filters (140, 170) are disposed at an optical path between the object and the image surface 180.

Figure 5:
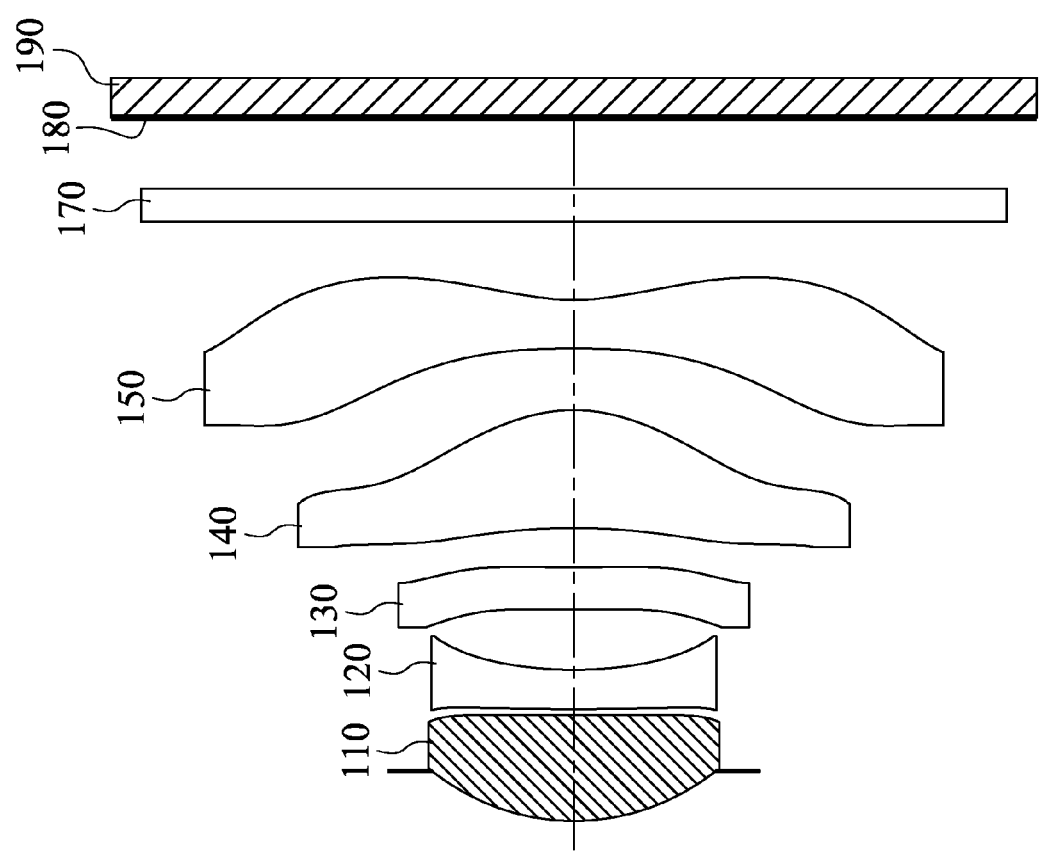
FIG. 5 shows a schematic view of one arrangement of a short wavelength cut filter according to the 4th example of the image capturing unit in FIG. 1.

FIG. 5 shows a schematic view of one arrangement of a short wavelength cut filter according to the 4th example of the image capturing unit in FIG. 1. In FIG. 5, the photographing optical lens assembly includes a short wavelength cut filter, the first lens element 110. The first lens element 110 is made of material which can absorb light with a short wavelength. Furthermore, the aforementioned short wavelength cut filter (110) is disposed at an optical path between the object and the image surface 180.

Figure 6:
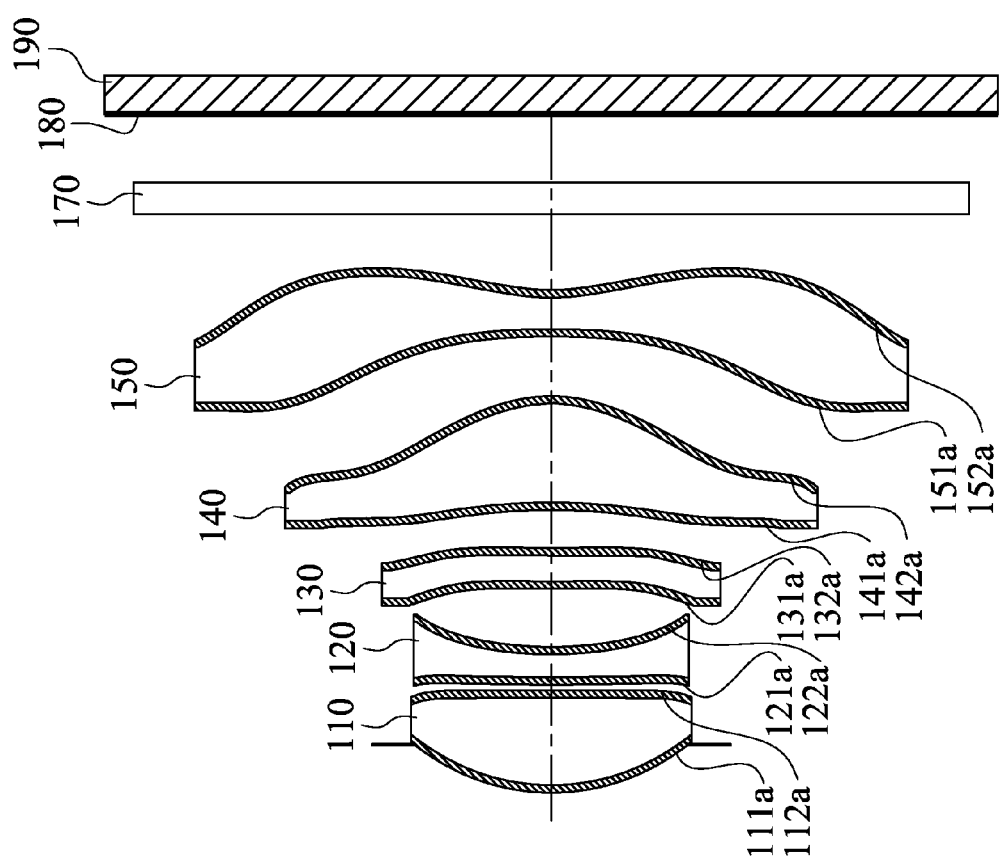
FIG. 6 shows a schematic view of one arrangement of short wavelength cut filters according to the 5th example of the image capturing unit in FIG. 1.

FIG. 6 shows a schematic view of one arrangement of short wavelength cut filters according to the 5th example of the image capturing unit in FIG. 1. In FIG. 6, the photographing optical lens assembly includes five short wavelength cut filters, the first lens element 110, the second lens element 120, the third lens element 130, the fourth lens element 140 and the fifth lens element 150. The first lens element 110 has a coating layer 111a formed on the object-side surface 111 and a coating layer 112a formed on the image-side surface 112. The second lens element 120 has a coating layer 121a formed on the object-side surface 121 and a coating layer 122a formed on the image-side surface 122. The third lens element 130 has a coating layer 131a formed on the object-side surface 131 and a coating layer 132a formed on the image-side surface 132. The fourth lens element 140 has a coating layer 141a formed on the object-side surface 141 and a coating layer 142a formed on the image-side surface 142. The fifth lens element 150 has a coating layer 151a formed on the object-side surface 151 and a coating layer 152a formed on the image-side surface 152. Furthermore, the aforementioned short wavelength cut filters (110, 120, 130, 140, 150) are disposed at an optical path between the object and the image surface 180.

Figure 13:
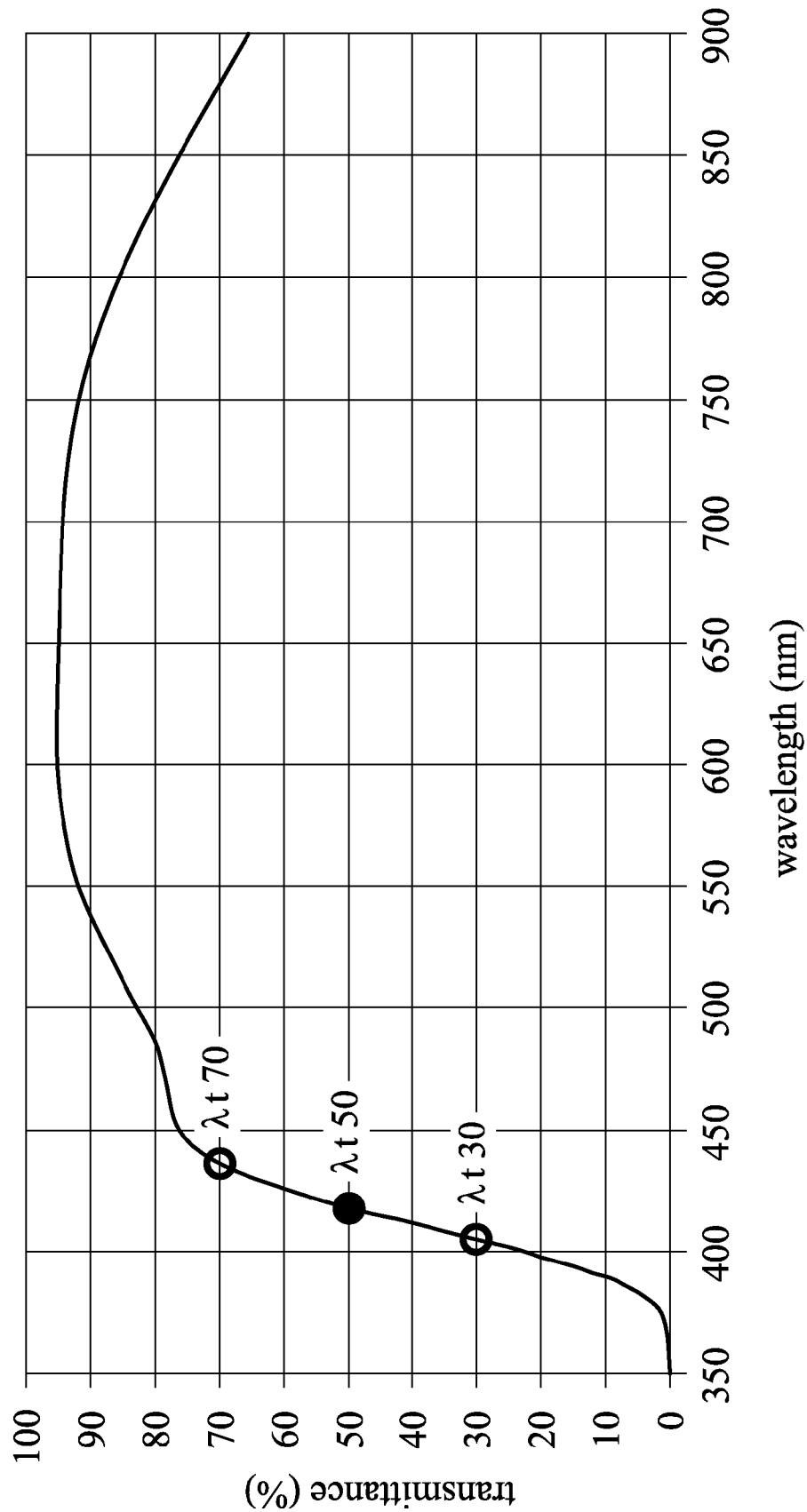
FIG. 13 shows the relationship between the transmittance and the wavelength of the photographing optical lens assembly in FIG. 6.

FIG. 13 shows the relationship between the transmittance and the wavelength of the photographing optical lens assembly in FIG. 6. In FIG. 13, when the wavelength correspondent to the 30% transmittance of the photographing optical lens assembly is $\lambda t30$, the wavelength correspondent to the 50% transmittance of the photographing optical lens assembly is $\lambda t50$, and the wavelength correspondent to the 70% transmittance of the photographing optical lens assembly is $\lambda t70$, these parameters have the following values: $\lambda t30=405.00$ nm; $\lambda t50=418.00$ nm; $\lambda t70=437.00$ nm; and the following conditions are satisfied: $(\lambda t50-400 \text{ nm}) \times (500 \text{ nm}-\lambda t50)/\lambda t50=3.53$ nm; and $(\lambda t70-420 \text{ nm}) \times (420 \text{ nm}-\lambda t30)/\lambda t50=0.61$ nm.

Furthermore, as shown in FIG. 13, when the average transmittance of the photographing optical lens assembly in the wavelength range of 390 nm to 410 nm is Tavg390~410, the average transmittance of the photographing optical lens assembly in the wavelength range of 410 nm to 430 nm is Tavg410~430, and the average transmittance of the photographing optical lens assembly in the wavelength range of 400 nm to 450 nm is Tavg400~450, these parameters have the following values: Tavg390~410=22.89%; Tavg410~430=51.8%; and Tavg400~450=55.12%.

Figure 7:
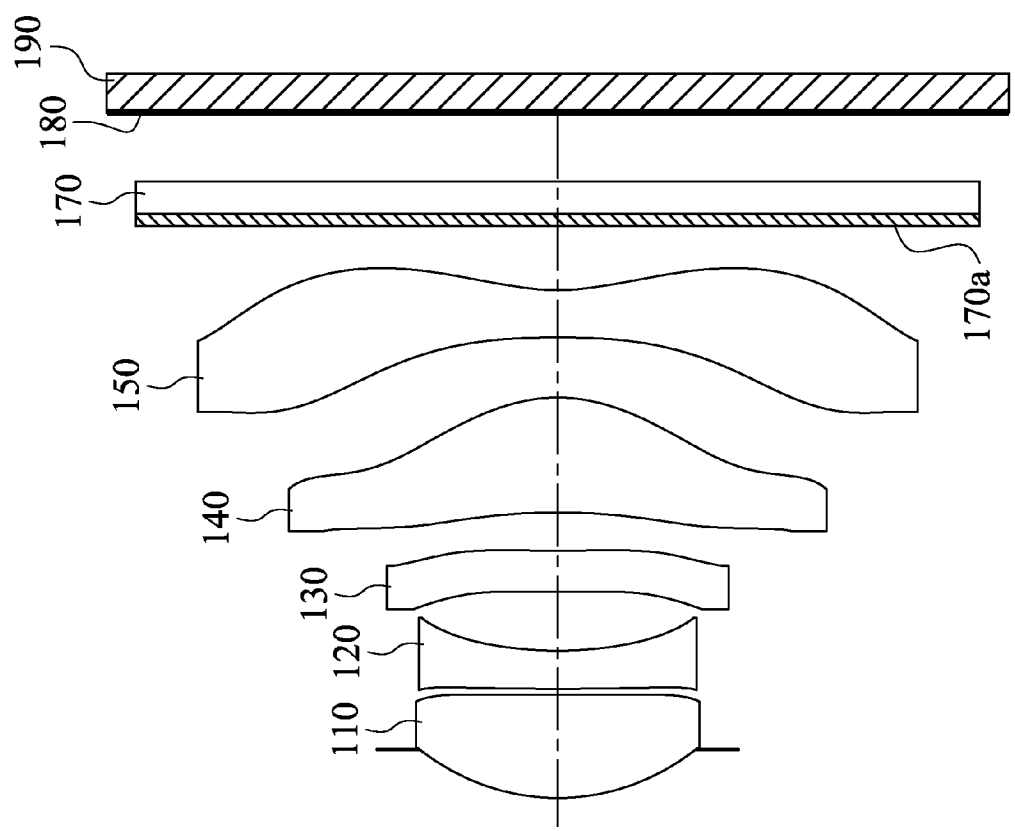
FIG. 7 shows a schematic view of one arrangement of a short wavelength cut filter according to the 6th example of the image capturing unit in FIG. 1.

FIG. 7 shows a schematic view of one arrangement of a short wavelength cut filter according to the 6th example of the image capturing unit in FIG. 1. In FIG. 7, the photographing optical lens assembly includes a short wavelength cut filter, the IR-cut filter 170. The IR-cut filter 170 has a coating layer 170a formed on the surface facing the object. Furthermore, the aforementioned short wavelength cut filter (170) is disposed at an optical path between the object and the image surface 180.

According to the 1st-6th examples, the photographing optical lens assembly can include at least one short wavelength cut filter, the short wavelength cut filter can be the original element of the photographing optical lens assembly, and the number and the position of the short wavelength cut filter can be adjusted according to practical needs. The following 2nd-4th embodiments can adopt one of the arrangements of the short wavelength cut filter in 1st-6th examples, and will not describe again herein.

Figure 11:
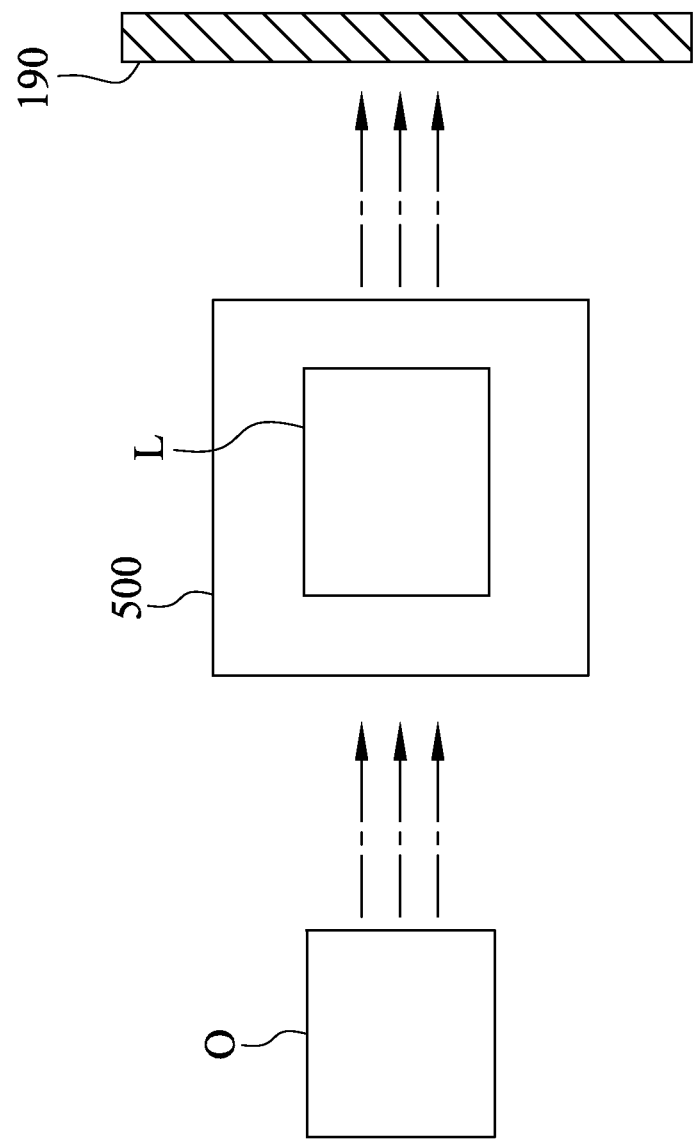
FIG. 11 shows a schematic view of one arrangement of the photographing optical lens assembly of FIG. 1, an object, an optical image stabilization element and the image sensor.

FIG. 11 shows a schematic view of one arrangement of the photographing optical lens assembly L of FIG. 1, an object O, an optical image stabilization element 500 and the image sensor 190. In FIG. 11, the photographing optical lens assembly L is connected with the optical image stabilization element 500. The incident light rays from the object O first enter into the photographing optical lens assembly L, and then are received by the image sensor 190. The optical image stabilization element 500 can compensate the offset caused by the shake during exposure process.

The following 2nd-4th embodiments can adopt the arrangement of FIG. 11, and will not describe again herein.

2nd Embodiment

Figure 8:
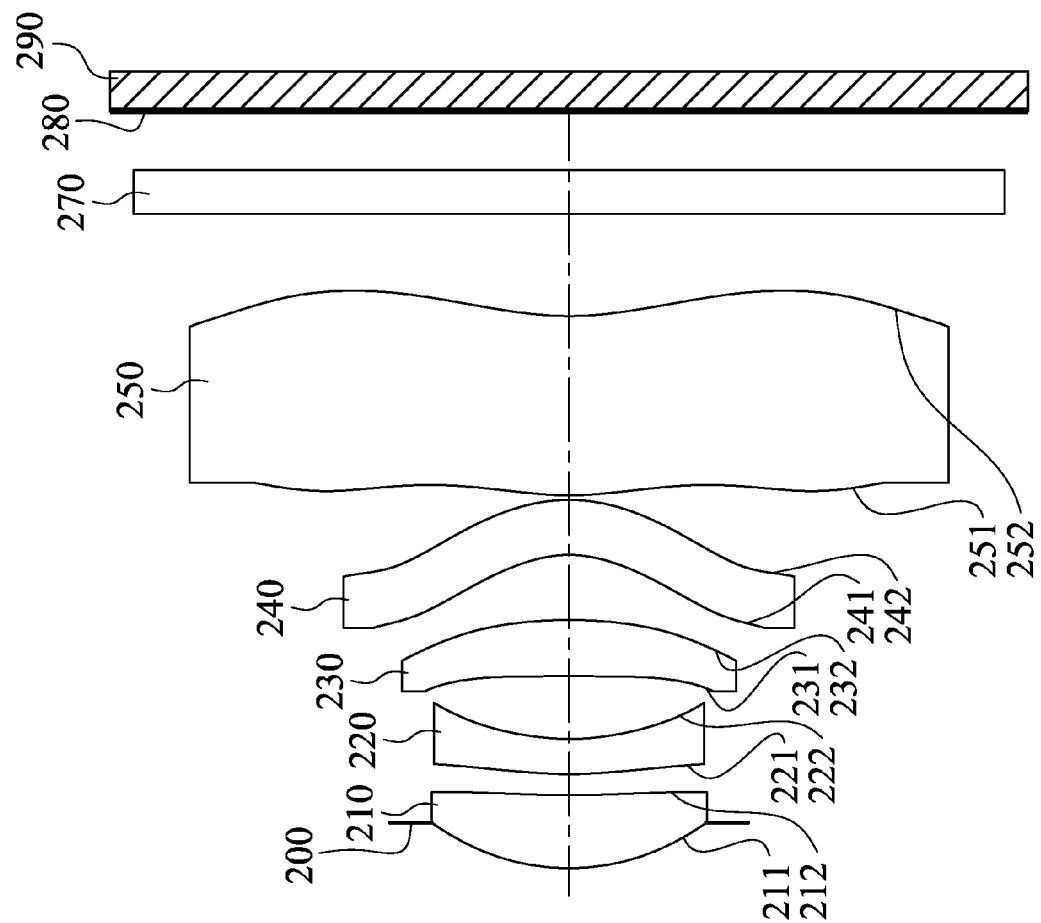
FIG. 8 is a schematic view of an image capturing unit according to the 2nd embodiment of the present disclosure.

FIG. 8 is a schematic view of an image capturing unit according to the 2nd embodiment of the present disclosure. In FIG. 8, the image capturing unit includes a photographing optical lens assembly (its reference numeral is omitted) and an image sensor 290. The photographing optical lens assembly includes, in order from an object side to an image side, an aperture stop 200, a first lens element 210, a second lens element 220, a third lens element 230, a fourth lens element 240, a fifth lens element 250, an IR-cut filter 270 and an image surface 280, wherein the image sensor 290 is disposed on the image surface 280 of the photographing optical lens assembly. The photographing optical lens assembly has a total of five lens elements (210-250) with refractive power. There is an air space between any two of the first lens element 210, the second lens element 220, the third lens element 230, the fourth lens element 240 and the fifth lens element 250 that are adjacent to each other.

The first lens element 210 with positive refractive power has a convex object-side surface 211 and a concave image-side surface 212. The first lens element 210 is made of plastic material and has the object-side surface 211 and the image-side surface 212 being both aspheric. Furthermore, the object-side surface 211 and the image-side surface 212 of the first lens element 210 both have at least one inflection point.

The second lens element 220 with negative refractive power has a convex object-side surface 221 and a concave image-side surface 222. The second lens element 220 is made of plastic material and has the object-side surface 221 and the image-side surface 222 being both aspheric. Furthermore, the object-side surface 221 of the second lens element 220 has at least one inflection point.

The third lens element 230 with positive refractive power has a concave object-side surface 231 and a convex image-side surface 232. The third lens element 230 is made of plastic material and has the object-side surface 231 and the image-side surface 232 being both aspheric.

The fourth lens element 240 with negative refractive power has a concave object-side surface 241 and a convex image-side surface 242. The fourth lens element 240 is made of plastic material and has the object-side surface 241 and the image-side surface 242 being both aspheric. Furthermore, the object-side surface 241 and the image-side surface 242 of the fourth lens element 240 both have at least one inflection point.

The fifth lens element 250 with positive refractive power has a convex object-side surface 251 and a concave image-side surface 252. The fifth lens element 250 is made of plastic material and has the object-side surface 251 and the image-side surface 252 being both aspheric. Furthermore, the object-side surface 251 and the image-side surface 252 of the fifth lens element 250 both have at least one inflection point.

The IR-cut filter 270 is made of glass material and disposed between the fifth lens element 250 and the image surface 280, and will not affect a focal length of the photographing optical lens assembly.

The detailed optical data of the 2nd embodiment are shown in Table 3 and the aspheric surface data are shown in Table 4 below.

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 4.16 | SD/TD | 0.92 |
| Fno | 2.21 | f/EPD | 2.21 |
| HFOV [deg.] | 36.2 | TL [mm] | 5.19 |
| Nmax | 1.640 | TL/ImgH | 1.68 |

TABLE 3

2nd Embodiment
f = 4.16 mm, Fno = 2.21, HFOV = 36.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.310 | | | | |
| 2 | Lens 1 | 1.567 | ASP | 0.501 | Plastic | 1.544 | 55.9 | 3.51 |
| 3 | | 7.726 | ASP | 0.143 | | | | |
| 4 | Lens 2 | 2.820 | ASP | 0.240 | Plastic | 1.640 | 23.3 | −6.40 |
| 5 | | 1.615 | ASP | 0.431 | | | | |
| 6 | Lens 3 | −171.080 | ASP | 0.386 | Plastic | 1.544 | 55.9 | 5.84 |
| 7 | | −3.120 | ASP | 0.446 | | | | |
| 8 | Lens 4 | −0.805 | ASP | 0.377 | Plastic | 1.640 | 23.3 | −8.22 |
| 9 | | −1.124 | ASP | 0.031 | | | | |
| 10 | Lens 5 | 2.213 | ASP | 1.228 | Plastic | 1.544 | 55.9 | 23.07 |
| 11 | | 2.161 | ASP | 0.700 | | | | |
| 12 | IR-cut filter | Plano | | 0.300 | Glass | 1.517 | 64.2 | — |
| 13 | | Plano | | 0.406 | | | | |
| 14 | Image | Plano | | — | | | | |

Note:
Reference wavelength is 587.6 nm (d-line).
The effective radius of the surface 11 is 2.6 mm.

TABLE 4

| Aspheric Coefficients | | | | | |
|---|---|---|---|---|---|
| Surface # | 2 | 3 | 4 | 5 | 6 |
| k = | −5.6729E−02 | −3.6858E+01 | −2.9748E+01 | −7.5419E+00 | −3.5000E+01 |
| A4 = | −1.4173E−03 | −7.9224E−02 | −1.0823E−01 | 1.6294E−02 | −8.0703E−02 |
| A6 = | 3.4141E−02 | 1.2212E−01 | 1.2402E−01 | 5.2629E−02 | −2.8333E−02 |
| A8 = | −4.4188E−02 | −8.9107E−02 | 1.3719E−02 | 1.2888E−01 | 1.5224E−02 |
| A10 = | −1.8227E−02 | −2.0461E−02 | −1.6058E−01 | −2.3347E−01 | −1.9561E−02 |
| A12 = | 9.6568E−02 | 4.2256E−02 | 9.3924E−02 | 1.3023E−01 | −3.0105E−03 |
| A14 = | −7.3915E−02 | −2.9081E−02 | 6.5936E−04 | 8.0060E−03 | 5.1744E−02 |
| A16 = | | | | | −4.2746E−02 |

| Surface # | 7 | 8 | 9 | 10 | 11 |
|---|---|---|---|---|---|
| k = | 1.5855E+00 | −3.6368E+00 | −7.3284E−01 | −2.1900E+01 | −1.0108E+01 |
| A4 = | −2.5215E−02 | −7.2108E−02 | 1.0669E−01 | −1.0677E−01 | −4.7664E−02 |
| A6 = | −3.9166E−02 | −1.6445E−02 | −3.1839E−02 | 6.1991E−02 | 1.7942E−02 |
| A8 = | 1.3165E−02 | 1.2361E−01 | 2.3781E−02 | −3.3262E−02 | −6.8829E−03 |
| A10 = | 2.7580E−02 | −4.5828E−02 | 9.6604E−03 | 1.4699E−02 | 1.8782E−03 |
| A12 = | −7.9444E−03 | −6.7087E−03 | −3.2436E−03 | −3.8116E−03 | −3.2921E−04 |
| A14 = | −3.3437E−03 | 2.7455E−03 | −2.6915E−03 | 5.0680E−04 | 3.3006E−05 |
| A16 = | | 2.8805E−04 | 7.7123E−04 | −2.7051E−05 | −1.4013E−06 |

-continued

| 2nd Embodiment | | | |
|---|---|---|---|
| (V2 + V4)/V1 | 0.834 | tan(HFOV) | 0.73 |
| CTmin [mm] | 0.240 | Lth [μm] | 1.50 |
| R1/Rlast | 0.7 | resolution [pixels] | 8M |
| ΣCT/TD | 0.72 | | |

3rd Embodiment

Figure 9:
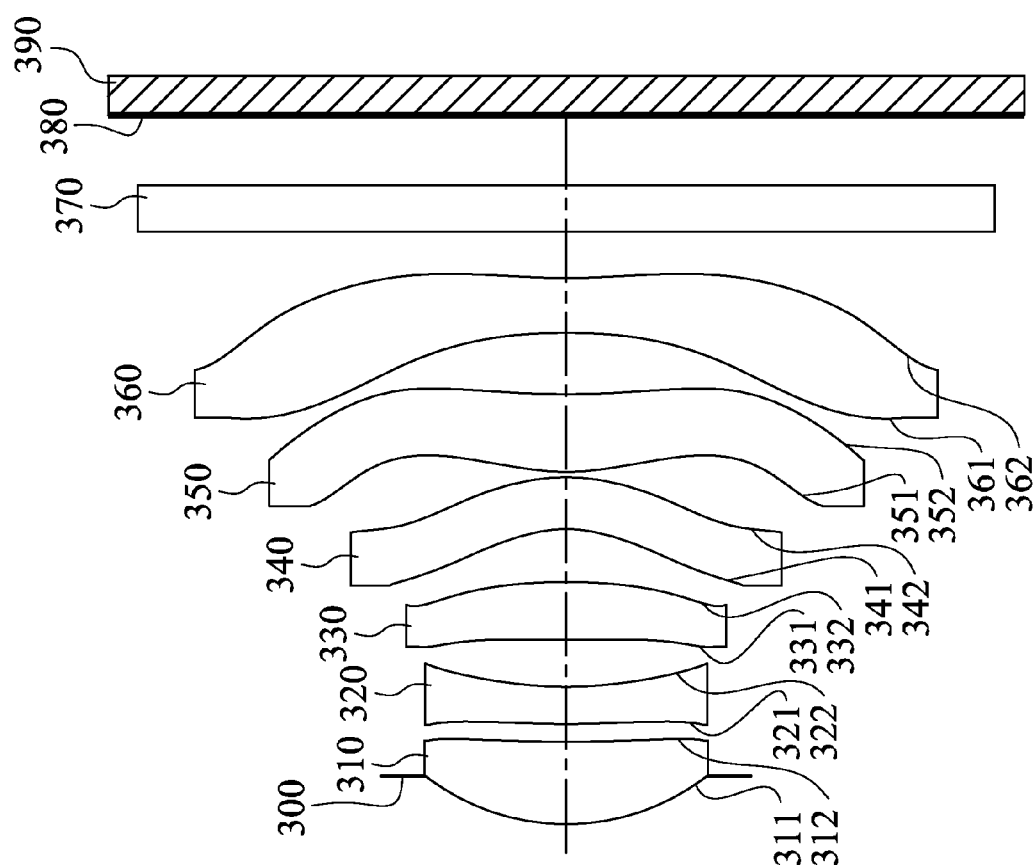
FIG. 9 is a schematic view of an image capturing unit according to the 3rd embodiment of the present disclosure.

FIG. 9 is a schematic view of an image capturing unit according to the 3rd embodiment of the present disclosure. In FIG. 9, the image capturing unit includes a photographing optical lens assembly (its reference numeral is omitted) and an image sensor 390. The photographing optical lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 370 and an image surface 380, wherein the image sensor 390 is disposed on the image surface 380 of the photographing optical lens assembly. The photographing optical lens assembly has a total of six lens elements (310-360) with refractive power. There is an air space between any two of the first lens element 310, the second lens element 320, the third lens element 330, the fourth lens element 340, the fifth lens element 350 and the sixth lens element 360 that are adjacent to each other.

The first lens element 310 with positive refractive power has a convex object-side surface 311 and a concave image-side surface 312. The first lens element 310 is made of plastic material and has the object-side surface 311 and the image-side surface 312 being both aspheric. Furthermore, the object-side surface 311 and the image-side surface 312 of the first lens element 310 both have at least one inflection point.

The second lens element 320 with negative refractive power has a convex object-side surface 321 and a concave image-side surface 322. The second lens element 320 is made of plastic material and has the object-side surface 321 and the image-side surface 322 being both aspheric. Furthermore, the object-side surface 321 of the second lens element 320 has at least one inflection point.

The third lens element 330 with positive refractive power has a convex object-side surface 331 and a convex image-side surface 332. The third lens element 330 is made of plastic material and has the object-side surface 331 and the image-side surface 332 being both aspheric. Furthermore, the object-side surface 331 and the image-side surface 332 of the third lens element 330 both have at least one inflection point.

The fourth lens element 340 with negative refractive power has a concave object-side surface 341 and a convex image-side surface 342. The fourth lens element 340 is made of plastic material and has the object-side surface 341 and the image-side surface 342 being both aspheric. Furthermore, the object-side surface 341 and the image-side surface 342 of the fourth lens element 340 both have at least one inflection point.

The fifth lens element 350 with positive refractive power has a convex object-side surface 351 and a concave image-side surface 352. The fifth lens element 350 is made of plastic material and has the object-side surface 351 and the image-side surface 352 being both aspheric. Furthermore, the object-side surface 351 and the image-side surface 352 of the fifth lens element 350 both have at least one inflection point.

The sixth lens element 360 with negative refractive power has a concave object-side surface 361 and a concave image-side surface 362. The sixth lens element 360 is made of plastic material and has the object-side surface 361 and the image-side surface 362 being both aspheric. Furthermore, the object-side surface 361 and the image-side surface 362 of the sixth lens element 360 both have at least one inflection point.

The IR-cut filter 370 is made of glass material and disposed between the sixth lens element 360 and the image surface 380, and will not affect a focal length of the photographing optical lens assembly.

The detailed optical data of the 3rd embodiment are shown in Table 5 and the aspheric surface data are shown in Table 6 below.

TABLE 5

3rd Embodiment
f = 3.76 mm, Fno = 2.05, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.313 | | | | |
| 2 | Lens 1 | 1.502 | ASP | 0.532 | Plastic | 1.544 | 55.9 | 3.32 |
| 3 | | 7.838 | ASP | 0.116 | | | | |
| 4 | Lens 2 | 5.266 | ASP | 0.240 | Plastic | 1.640 | 23.3 | −6.93 |
| 5 | | 2.365 | ASP | 0.304 | | | | |
| 6 | Lens 3 | 18.265 | ASP | 0.375 | Plastic | 1.544 | 55.9 | 5.37 |
| 7 | | −3.450 | ASP | 0.342 | | | | |
| 8 | Lens 4 | −0.854 | ASP | 0.335 | Plastic | 1.640 | 23.3 | −4.85 |
| 9 | | −1.359 | ASP | 0.035 | | | | |
| 10 | Lens 5 | 1.507 | ASP | 0.503 | Plastic | 1.544 | 55.9 | 3.53 |
| 11 | | 6.181 | ASP | 0.396 | | | | |
| 12 | Lens 6 | −3.947 | ASP | 0.355 | Plastic | 1.544 | 55.9 | −3.71 |
| 13 | | 4.270 | ASP | 0.300 | | | | |
| 14 | IR-cut filter | Plano | | 0.300 | Glass | 1.517 | 64.2 | — |
| 15 | | Plano | | 0.454 | | | | |
| 16 | Image | Plano | | — | | | | |

Note:
Reference wavelength is 587.6 nm (d-line).
The effective radius of the surface 13 is 2.4 mm.

TABLE 6

Aspheric Coefficients

| Surface # | 2 | 3 | 4 | 5 | 6 | 7 |
|---|---|---|---|---|---|---|
| k = | −6.4870E−02 | 2.3478E+01 | −8.8638E+01 | −9.7970E+00 | 1.7460E+01 | 5.7478E+00 |
| A4 = | 5.5904E−03 | −1.0659E−01 | −1.6692E−01 | −8.1225E−02 | −1.0389E−01 | 2.1986E−02 |
| A6 = | −1.3660E−02 | 2.3805E−01 | 2.7219E−01 | 2.1244E−01 | 4.8060E−02 | −1.5098E−01 |
| A8 = | 2.0016E−01 | −6.0309E−01 | −2.4679E−01 | −2.4575E−01 | −6.6034E−01 | 1.1207E−01 |
| A10 = | −6.1001E−01 | 1.1522E+00 | −2.2958E−01 | 3.6870E−01 | 1.9391E+00 | 2.8355E−02 |
| A12 = | 8.1947E−01 | −1.2524E+00 | 1.3294E+00 | −4.6072E−01 | −3.0830E+00 | −3.6024E−02 |
| A14 = | −4.1429E−01 | 4.5672E−01 | −2.1429E+00 | 2.5826E−01 | 2.7899E+00 | 4.2908E−02 |
| A16 = | | | 1.0999E+00 | | −9.9719E−01 | |

| Surface # | 8 | 9 | 10 | 11 | 12 | 13 |
|---|---|---|---|---|---|---|
| k = | −4.7023E+00 | −8.7868E−01 | −1.3672E+01 | −5.3386E+00 | 6.9770E−01 | 1.1387E+00 |
| A4 = | −2.6241E−02 | 4.8544E−02 | −4.0903E−02 | 2.5311E−02 | −9.0910E−02 | −1.6603E−01 |
| A6 = | −1.5707E−01 | −8.2430E−02 | −1.3081E−01 | −1.7478E−01 | 4.5310E−02 | 9.7510E−02 |
| A8 = | 4.7957E−01 | 2.2849E−01 | 1.8052E−01 | 1.7865E−01 | −1.2802E−02 | −4.9686E−02 |
| A10 = | −3.3465E−01 | −1.4461E−01 | −1.3830E−01 | −1.0812E−01 | 5.1967E−03 | 1.7677E−02 |
| A12 = | 5.7402E−03 | 3.2583E−02 | 5.4094E−02 | 3.7750E−02 | −1.5726E−03 | −3.8989E−03 |
| A14 = | 7.8773E−02 | −1.9232E−03 | −9.7233E−03 | −6.8582E−03 | 2.3486E−04 | 4.6133E−04 |
| A16 = | −2.6829E−02 | | 6.2408E−04 | 4.9958E−04 | −1.3291E−05 | −2.1973E−05 |

In Table 5, the curvature radius, the thickness and the focal length are shown in millimeters (mm). Surface numbers 0-16 represent the surfaces sequentially arranged from the object-side to the image-side along the optical axis. In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.76 | SD/TD | 0.91 |
| Fno | 2.05 | f/EPD | 2.05 |
| HFOV [deg.] | 37.5 | TL [mm] | 4.59 |
| Nmax | 1.640 | TL/ImgH | 1.56 |
| (V2 + V4)/V1 | 0.834 | tan(HFOV) | 0.77 |
| CTmin [mm] | 0.240 | Lth [μm] | 1.12 |
| R1/Rlast | 0.4 | resolution [pixels] | 13M |
| ΣCT/TD | 0.66 | | |

In the photographing optical lens assembly according to the 3rd embodiment, when a wavelength correspondent to a 30% transmittance of the photographing optical lens assembly is λt30, a wavelength correspondent to a 50% transmittance of the photographing optical lens assembly is λt50, and a wavelength correspondent to a 70% transmittance of the photographing optical lens assembly is λt70, the following conditions are satisfied: 0.00 nm<(λt50−400 nm)×(500 nm−λt50)/λt50<5.55 nm; and 0.00 nm<(λt70−420 nm)×(420 nm−λt30)/λt50<15.00 nm.

In the photographing optical lens assembly according to the 3rd embodiment, when an average transmittance of the photographing optical lens assembly in a wavelength range of 390 nm to 410 nm is Tavg390~410, an average transmittance of the photographing optical lens assembly in a wavelength range of 410 nm to 430 nm is Tavg410~430, and an average transmittance of the photographing optical lens assembly in a wavelength range of 400 nm to 450 nm is Tavg400~450, the following conditions are satisfied: Tavg390~410<30%; 45%<Tavg410~430<55%; and 30%<Tavg400~450<60%.

Figure 14:
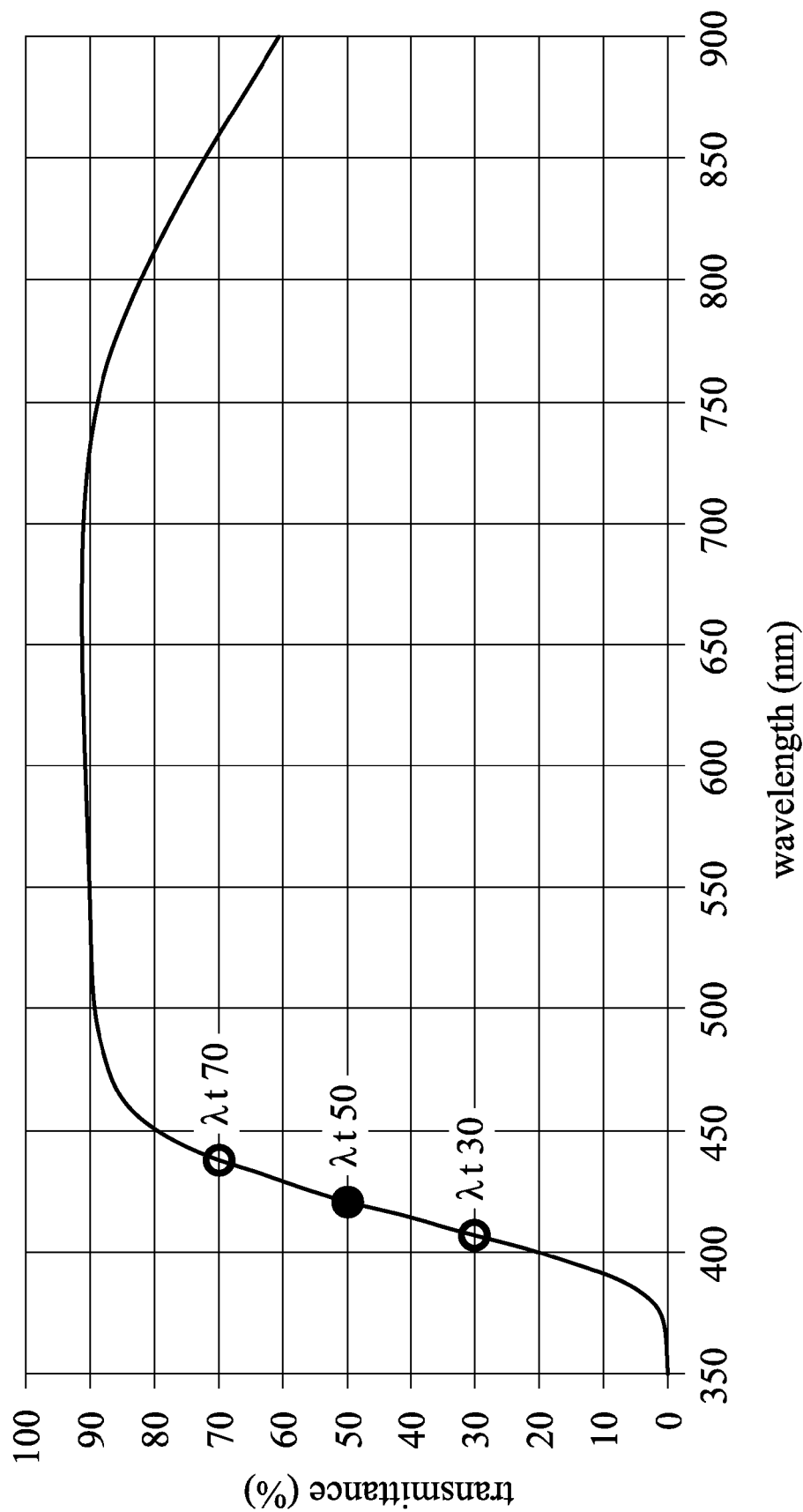
FIG. 14 shows the relationship between the transmittance and the wavelength according to the one example of the photographing optical lens assembly in FIG. 9.

FIG. 14 shows the relationship between the transmittance and the wavelength according to the one example of the photographing optical lens assembly in FIG. 9. In the example, the photographing optical lens assembly includes two short wavelength cut filters, the first lens element 310 and the second lens element 320. The first lens element 310 has two coating layers (not shown) formed on the object-side surface 311 and the image-side surface 312, respectively. The second lens element 320 has two coating layers (not shown) formed on the object-side surface 321 and the image-side surface 322, respectively (the arrangement of the short wavelength cut filters is similar with that in FIG. 2, that is, the coating layers are formed on two surfaces of each of the two lens elements closest to the object). Furthermore, the aforementioned short wavelength cut filters (310, 320) are disposed at an optical path between the object and the image surface 380. In FIG. 14, when the wavelength correspondent to the 30% transmittance of the photographing optical lens assembly is λt30, the wavelength correspondent to the 50% transmittance of the photographing optical lens assembly is λt50, and the wavelength correspondent to the 70% transmittance of the photographing optical lens assembly is λt70, these parameters have the following values: λt30=408.00 nm; λt50=422.00 nm; λt70=439.00 nm; and the following conditions are satisfied: (λt50−400 nm)×(500 nm−λt50)/λt50=4.07 nm; and (λt70−420 nm)×(420 nm−λt30)/λt50=0.54 nm.

Furthermore, as shown in FIG. 14, when the average transmittance of the photographing optical lens assembly in the wavelength range of 390 nm to 410 nm is Tavg390~410, the average transmittance of the photographing optical lens assembly in the wavelength range of 410 nm to 430 nm is Tavg410~430, and the average transmittance of the photographing optical lens assembly in the wavelength range of 400 nm to 450 nm is Tavg400~450, these parameters have the following values: Tavg390~410=20.32%; Tavg410~430=47.8%; and Tavg400~450=52.88%.

Figure 15:
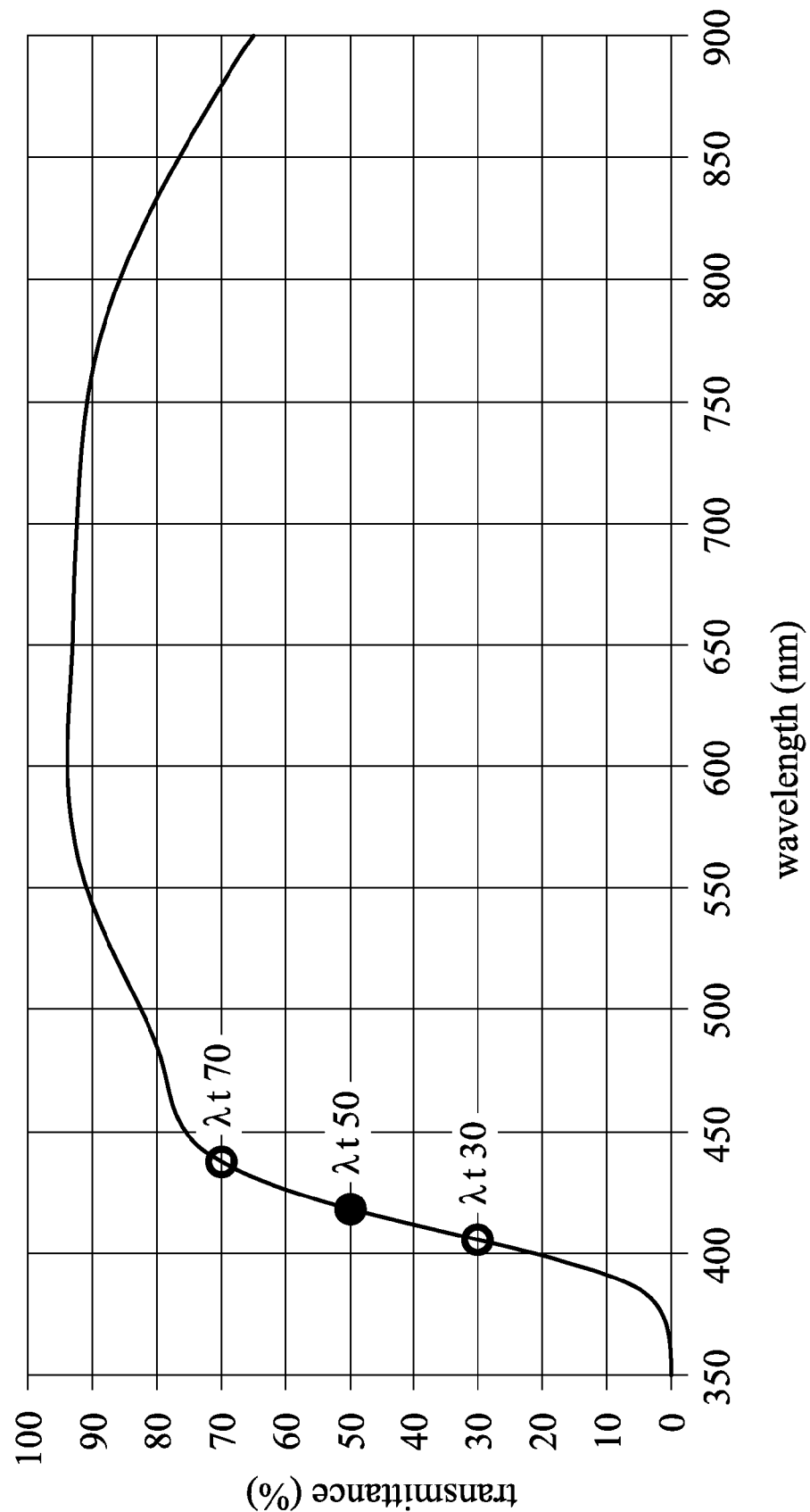
FIG. 15 shows the relationship between the transmittance and the wavelength according to another example of the photographing optical lens assembly in FIG. 9.

FIG. 15 shows the relationship between the transmittance and the wavelength according to another example of the photographing optical lens assembly in FIG. 9. In the example, the photographing optical lens assembly includes six short wavelength cut filters, the first lens element 310, the second lens element 320, the third lens element 330, the fourth lens element 340, the fifth lens element 350 and the six lens element 360. The first lens element 310 has two coating layers (not shown) formed on the object-side surface 311 and the image-side surface 312, respectively. The second lens element 320 has two coating layers (not shown) formed on the object-side surface 321 and the image-side surface 322, respectively. The third lens element 330 has two coating layers (not shown) formed on the object-side surface 331 and the image-side surface 332, respectively. The fourth lens element 340 has two coating layers (not shown) formed on the object-side surface 341 and the image-side surface 342, respectively. The fifth lens element 350 has two coating layers (not shown) formed on the object-side surface 351 and the image-side surface 352, respectively. The sixth lens element 360 has two coating layers (not shown) formed on the object-side surface 361 and the image-side surface 362, respectively (the arrangement of the short wavelength cut filters is similar with that in FIG. 6, that is, the coating layers are formed on two surfaces of each of the lens elements with refractive power). Furthermore, the aforementioned short wavelength cut filters (310-360) are disposed at an optical path between the object and the image surface 380. As shown in FIG. 15, when the wavelength correspondent to the 30% transmittance of the photographing optical lens assembly is λt30, the wavelength correspondent to the 50% transmittance of the photographing optical lens assembly is λt50, and the wavelength correspondent to the 70% transmittance of the photographing optical lens assembly is λt70, these parameters have the following values: λt30=406.00 nm; λt50=419.00 nm; λt70=439.00 nm; and the following conditions are satisfied: (λt50−400 nm)×(500 nm−λt50)/λt50=3.67 nm; and (λt70−420 nm)×(420 nm−λt30)/λt50=0.63 nm.

Furthermore, as shown in FIG. 15, when the average transmittance of the photographing optical lens assembly in the wavelength range of 390 nm to 410 nm is Tavg390~410, the average transmittance of the photographing optical lens assembly in the wavelength range of 410 nm to 430 nm is Tavg410~430, and the average transmittance of the photographing optical lens assembly in the wavelength range of 400 nm to 450 nm is Tavg400~450, these parameters have the following values: Tavg390~410=21.55%; Tavg410~430=51.4%; and Tavg40018 450=54.42%.

4th Embodiment

Figure 10:
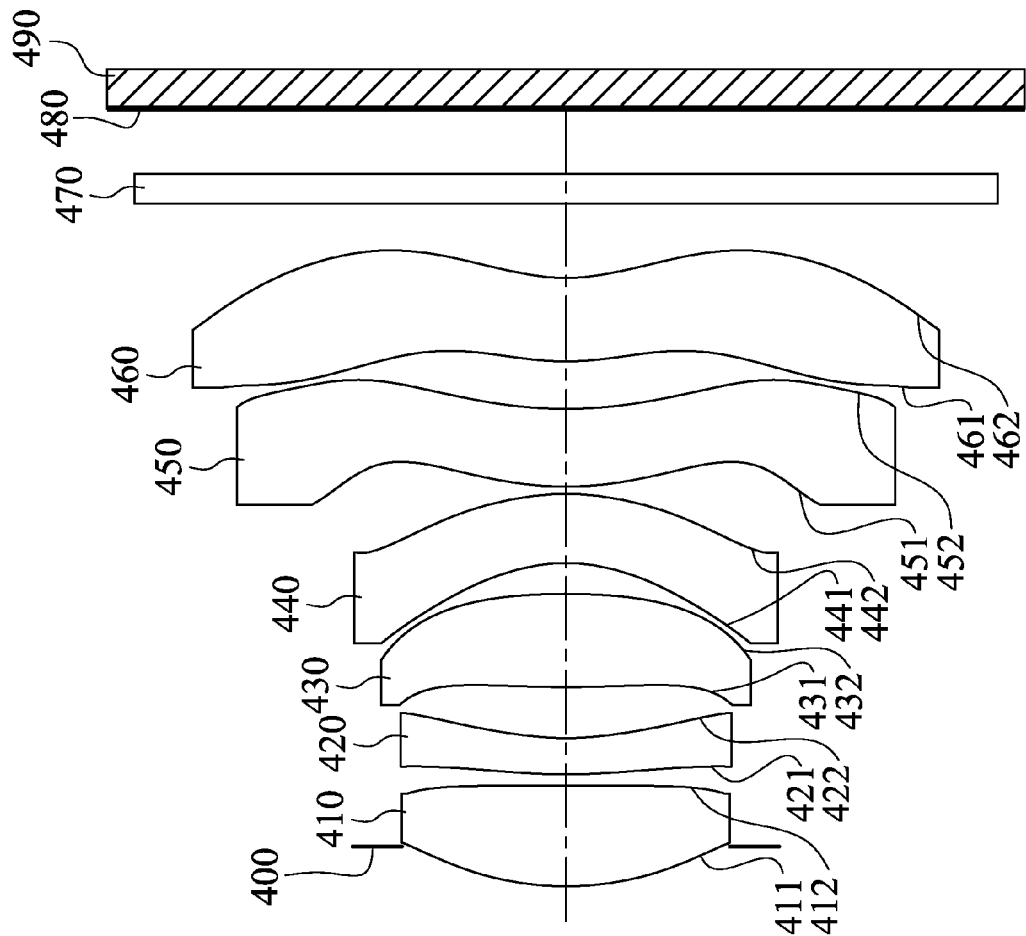
FIG. 10 is a schematic view of an image capturing unit according to the 4th embodiment of the present disclosure.

FIG. 10 is a schematic view of an image capturing unit according to the 4th embodiment of the present disclosure. In FIG. 10, the image capturing unit includes a photographing optical lens assembly (its reference numeral is omitted) and an image sensor 490. The photographing optical lens assembly includes, in order from an object side to an image side, an aperture stop 400, a first lens element 410, a second lens element 420, a third lens element 430, a fourth lens element 440, a fifth lens element 450, a sixth lens element 460, an IR-cut filter 470 and an image surface 480, wherein the image sensor 490 is disposed on the image surface 480 of the photographing optical lens assembly. The photographing optical lens assembly has a total of six lens elements (410-460) with refractive power. There is an air space between any two of the first lens element 410, the second lens element 420, the third lens element 430, the fourth lens element 440, the fifth lens element 450 and the sixth lens element 460 that are adjacent to each other.

The first lens element 410 with positive refractive power has a convex object-side surface 411 and a concave image-side surface 412. The first lens element 410 is made of plastic material and has the object-side surface 411 and the image-side surface 412 being both aspheric. Furthermore, the object-side surface 411 and the image-side surface 412 of the first lens element 410 both have at least one inflection point.

The second lens element 420 with negative refractive power has a convex object-side surface 421 and a concave image-side surface 422. The second lens element 420 is made of plastic material and has the object-side surface 421 and the image-side surface 422 being both aspheric. Furthermore, the object-side surface 421 and the image-side surface 422 of the second lens element 420 both have at least one inflection point.

The third lens element 430 with positive refractive power has a convex object-side surface 431 and a convex image-side surface 432. The third lens element 430 is made of plastic material and has the object-side surface 431 and the image-side surface 432 being both aspheric. Furthermore, the object-side surface 431 and the image-side surface 432 of the third lens element 430 both have at least one inflection point.

The fourth lens element 440 with negative refractive power has a concave object-side surface 441 and a convex image-side surface 442. The fourth lens element 440 is made of plastic material and has the object-side surface 441 and the image-side surface 442 being both aspheric. Furthermore, the image-side surface 442 of the fourth lens element 440 has at least one inflection point.

The fifth lens element 450 with positive refractive power has a convex object-side surface 451 and a concave image-side surface 452. The fifth lens element 450 is made of plastic material and has the object-side surface 451 and the image-side surface 452 being both aspheric. Furthermore, the object-side surface 451 and the image-side surface 452 of the fifth lens element 450 both have at least one inflection point.

The sixth lens element 460 with negative refractive power has a convex object-side surface 461 and a concave image-side surface 462. The sixth lens element 460 is made of plastic material and has the object-side surface 461 and the image-side surface 462 being both aspheric. Furthermore, the object-side surface 461 and the image-side surface 462 of the sixth lens element 460 both have at least one inflection point.

The IR-cut filter 470 is made of glass material and disposed between the sixth lens element 460 and the image surface 480, and will not affect a focal length of the photographing optical lens assembly.

The detailed optical data of the 4th embodiment are shown in Table 7 and the aspheric surface data are shown in Table 8 below.

TABLE 7

| 4th Embodiment f = 3.96 mm, Fno = 1.80, HFOV = 37.3 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Ape. Stop | Plano | −0.267 | | | | |

TABLE 7-continued

4th Embodiment
f = 3.96 mm, Fno = 1.80, HFOV = 37.3 deg.

| Surface # | | Curvature Radius | | Thickness | Material | Index | Abbe # | Focal Length |
|---|---|---|---|---|---|---|---|---|
| 2 | Lens 1 | 2.010 | ASP | 0.677 | Plastic | 1.544 | 55.9 | 3.91 |
| 3 | | 31.530 | ASP | 0.075 | | | | |
| 4 | Lens 2 | 3.387 | ASP | 0.245 | Plastic | 1.639 | 23.5 | −8.46 |
| 5 | | 2.023 | ASP | 0.342 | | | | |
| 6 | Lens 3 | 7.311 | ASP | 0.627 | Plastic | 1.544 | 55.9 | 5.11 |
| 7 | | −4.347 | ASP | 0.207 | | | | |
| 8 | Lens 4 | −1.187 | ASP | 0.464 | Plastic | 1.639 | 23.5 | −8.05 |
| 9 | | −1.778 | ASP | 0.050 | | | | |
| 10 | Lens 5 | 2.354 | ASP | 0.522 | Plastic | 1.544 | 55.9 | 19.67 |
| 11 | | 2.782 | ASP | 0.319 | | | | |
| 12 | Lens 6 | 1.829 | ASP | 0.561 | Plastic | 1.535 | 55.7 | −16.50 |
| 13 | | 1.353 | ASP | 0.500 | | | | |
| 14 | IR-cut filter | Plano | | 0.200 | Glass | 1.517 | 64.2 | — |
| 15 | | Plano | | 0.439 | | | | |
| 16 | Image | Plano | | — | | | | |

Note:
Reference wavelength is 587.6 nm (d-line).
The effective radius of the surface 5 is 1.11 mm.

TABLE 8

Aspheric Coefficients

| Surface # | 2 | 3 | 4 | 5 | 6 | 7 |
|---|---|---|---|---|---|---|
| k = | −6.6747E−02 | −8.8637E+01 | −6.2243E+01 | −2.7217E+01 | −8.7787E+01 | −8.4534E+00 |
| A4 = | −1.4946E−02 | −1.1394E−01 | −8.0633E−02 | 1.3795E−01 | −5.7451E−02 | −1.0116E−01 |
| A6 = | 4.4515E−02 | 2.5658E−01 | 1.4671E−01 | −3.9084E−01 | −1.4867E−02 | 4.2395E−02 |
| A8 = | −8.2974E−02 | −3.9323E−01 | −1.5624E−01 | 6.9752E−01 | −1.7856E−02 | −9.9994E−02 |
| A10 = | 5.8251E−02 | 3.3010E−01 | 9.4313E−02 | −7.3331E−01 | −1.4198E−03 | 4.3574E−02 |
| A12 = | −1.4040E−02 | −1.6484E−01 | −4.7033E−02 | 4.0298E−01 | 2.4760E−03 | 8.1761E−02 |
| A14 = | −4.8508E−03 | 3.4484E−02 | 1.3813E−02 | −9.2071E−02 | −5.6720E−03 | −9.6887E−02 |
| A16 = | | | | | | 2.7818E−02 |

| Surface # | 8 | 9 | 10 | 11 | 12 | 13 |
|---|---|---|---|---|---|---|
| k = | −9.4945E−01 | −8.8397E+00 | −1.1847E+01 | −3.5918E+01 | −1.0187E+00 | −9.7968E−01 |
| A4 = | 8.9792E−02 | −7.6522E−02 | 1.1969E−01 | 9.4540E−02 | −3.3501E−01 | −3.0220E−01 |
| A6 = | 9.2830E−03 | −1.3175E−02 | −2.1348E−01 | −7.4155E−02 | 1.4786E−01 | 1.5623E−01 |
| A8 = | −2.2169E−01 | 4.3013E−02 | 1.6043E−01 | 1.7788E−02 | −3.4640E−02 | −6.4490E−02 |
| A10 = | 3.5280E−01 | −1.6002E−02 | −8.6119E−02 | −1.5586E−03 | 4.2108E−03 | 1.8046E−02 |
| A12 = | −2.1724E−01 | 1.1110E−03 | 2.4413E−02 | 4.3975E−05 | −1.2426E−04 | −3.0708E−03 |
| A14 = | 4.6714E−02 | 7.6513E−04 | −2.5903E−03 | −4.4295E−06 | −2.4390E−05 | 2.8257E−04 |
| A16 = | | | | | 1.8097E−06 | −1.0718E−05 |

In Table 7, the curvature radius, the thickness and the focal length are shown in millimeters (mm). Surface numbers 0-16 represent the surfaces sequentially arranged from the object-side to the image-side along the optical axis. In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.96 | SD/TD | 0.93 |
| Fno | 1.80 | f/EPD | 1.80 |
| HFOV [deg.] | 37.3 | TL [mm] | 5.23 |

-continued

| 4th Embodiment | | | |
|---|---|---|---|
| Nmax | 1.639 | TL/ImgH | 1.70 |
| (V2 + V4)N1 | 0.841 | tan(HFOV) | 0.76 |
| CTmin [mm] | 0.245 | Lth [µm] | 1.22 |
| R1/Rlast | 1.5 | resolution [pixels] | 12M |
| ΣCT/TD | 0.76 | | |

5th Embodiment

Figure 16:
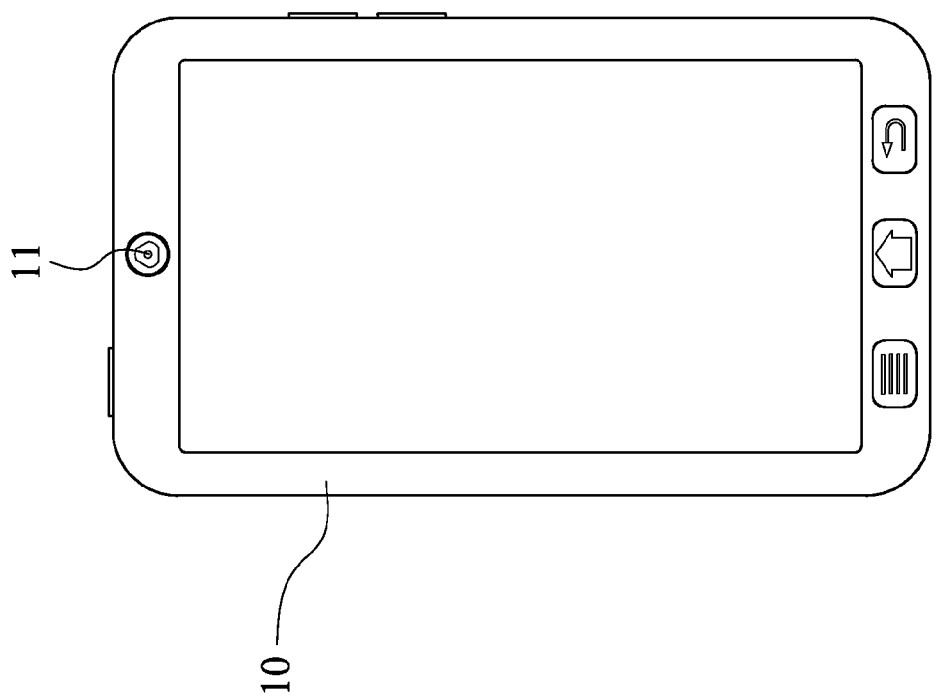
FIG. 16 is a schematic view of an electronic device according to the 5th embodiment of the present disclosure.

FIG. 16 is a schematic view of an electronic device 10 according to the 5th embodiment of the present disclosure. The electronic device 10 of the 5th embodiment is a smart phone, and the electronic device 10 can include one, two or more image capturing units 11 (only one image capturing unit 11 is shown). The image capturing unit 11 includes a photographing optical lens assembly (not shown herein) according to the present disclosure and an image sensor (not shown

6th Embodiment

Figure 17:
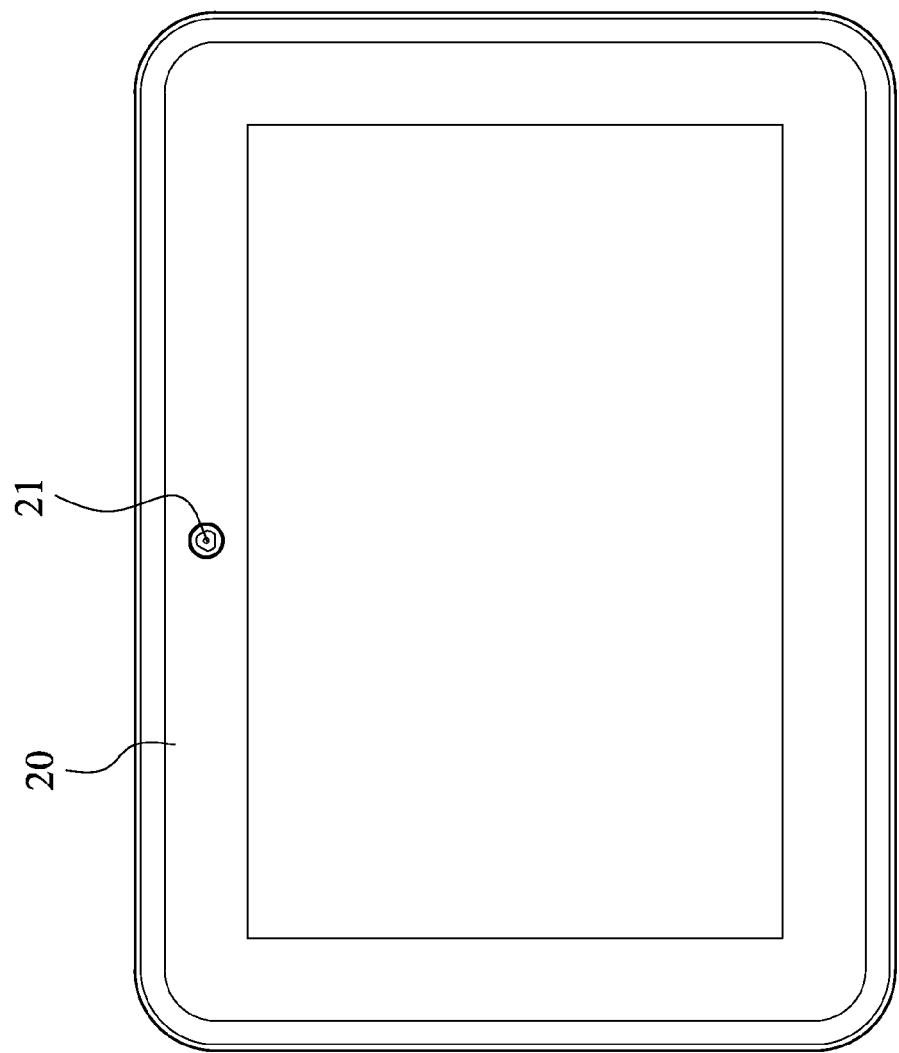
FIG. 17 is a schematic view of an electronic device according to the 6th embodiment of the present disclosure.

FIG. 17 is a schematic view of an electronic device 20 according to the 6th embodiment of the present disclosure. The electronic device 20 of the 6th embodiment is a tablet personal computer, and the electronic device 20 can include one, two or more image capturing units 21 (only one image capturing unit 21 is shown). The image capturing units 21 includes a photographing optical lens assembly (not shown herein) according to the present disclosure and an image sensor (not shown herein), wherein the image sensor is disposed on or near an image surface of the photographing optical lens assembly.

7th Embodiment

Figure 18:
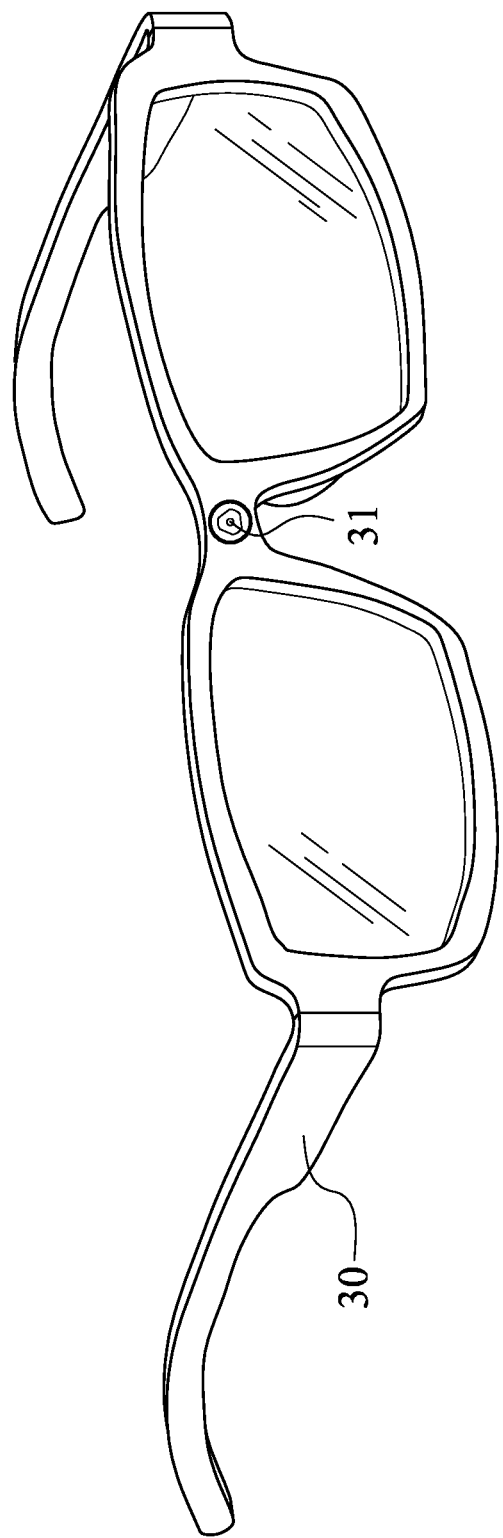
FIG. 18 is a schematic view of an electronic device according to the 7th embodiment of the present disclosure.

FIG. 18 is a schematic view of an electronic device 30 according to the 7th embodiment of the present disclosure. The electronic device 30 of the 7th embodiment is a head-mounted display, and the electronic device 30 can include one, two or more image capturing units 31 (only one image capturing unit 31 is shown). The image capturing unit 31 includes a photographing optical lens assembly (not shown herein) according to the present disclosure and an image sensor (not shown herein), wherein the image sensor is disposed on or near an image surface of the photographing optical lens assembly.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A photographing optical lens assembly comprising, in order from an object side to an image side:
    a first lens element with positive refractive power having a convex object-side surface, wherein the object-side surface and an image-side surface of the first lens element are aspheric;
    a second lens element having negative refractive power, wherein an object-side surface and an image-side surface of the second lens element are aspheric;
    a third lens element having refractive power, wherein an object-side surface and an image-side surface of the third lens element are aspheric;
    a fourth lens element having positive refractive power, wherein an object-side surface and an image-side surface of the fourth lens element are aspheric; and
    a fifth lens element with negative refractive power having a concave image-side surface, wherein an object-side surface and the image-side surface of the fifth lens element are aspheric, and at least one of the object-side surface and the image-side surface thereof has at least one inflection point;
    wherein the photographing optical lens assembly has a total of five lens elements with refractive power, there is an air space between every two lens elements of the first lens element, the second lens element, the third lens element, the fourth lens element and the fifth lens element adjacent to each other, a wavelength correspondent to a 50% transmittance of the photographing optical lens assembly is $\lambda t50$, a sum of central thicknesses of the lens elements with refractive power is $\Sigma CT$, an axial distance between an object-side surface of a lens element closest to an object and an image-side surface of a lens element closest to an image surface is TD, a curvature radius of the object-side surface of the lens element closest to the object is R1, a curvature radius of the image-side surface of the lens element closest to the image surface is Rlast, an axial distance between the object-side surface of the lens element closest to the object and the image surface is TL, and the following conditions are satisfied:

$0.00$ nm $< (\lambda t50 - 400$ nm$) \times (500$ nm $- \lambda t50) / \lambda t50 < 5.55$ nm;

$0.50 < \Sigma CT/TD < 0.90$;

$0 < R1/R$last $< 3.0$; and $TL < 8.5$ mm.

2. The photographing optical lens assembly of claim 1, further comprising:
    a stop, wherein an axial distance between the stop and the image-side surface of the lens element closest to the image surface is SD, the axial distance between the object-side surface of the lens element closest to the object and the image-side surface of the lens element closest to the image surface is TD, and the following condition is satisfied:

$0.65 < SD/TD < 1.0$.

3. The photographing optical lens assembly of claim 2, wherein the third lens element has negative refractive power.

4. The photographing optical lens assembly of claim 2, wherein the second lens element has the image-side surface being concave, and the fourth lens element has the image-side surface being convex.

5. The photographing optical lens assembly of claim 1, wherein an average transmittance of the photographing optical lens assembly in a wavelength range of 410 nm to 430 nm is Tavg410~430, and the following condition is satisfied:

$45\% < T$avg$410$~$430 < 55\%$.

6. The photographing optical lens assembly of claim 1, wherein a wavelength correspondent to a 30% transmittance of the photographing optical lens assembly is $\lambda t30$, the wavelength correspondent to the 50% transmittance of the photographing optical lens assembly is $\lambda t50$, a wavelength correspondent to a 70% transmittance of the photographing optical lens assembly is $\lambda t70$, and the following condition is satisfied:

$0.00$ nm $< (\lambda t70 - 420$ nm$) \times (420$ nm $- \lambda t30) / \lambda t50 < 15.00$ nm.

7. The photographing optical lens assembly of claim 1, wherein at least one of the first lens element, the second lens element, the third lens element, the fourth lens element and the fifth lens element is a short wavelength cut filter.

8. An image capturing unit, comprising:
    the photographing optical lens assembly of claim 1; and
    an image sensor disposed on the image surface of the photographing optical lens assembly, wherein a side length of a pixel of the image sensor is Lth, and the following condition is satisfied:

$L$th $< 1.6$ μm.

9. A photographing optical lens assembly comprising, in order from an object side to an image side:
- a first lens element with positive refractive power having a convex object-side surface, wherein the object-side surface and an image-side surface of the first lens element are aspheric;
- a second lens element with negative refractive power having a concave image-side surface, wherein an object-side surface and the image-side surface of the second lens element are aspheric;
- a third lens element having refractive power, wherein an object-side surface and an image-side surface of the third lens element are aspheric;
- a fourth lens element having negative refractive power, wherein an object-side surface and an image-side surface of the fourth lens element are aspheric; and
- a fifth lens element with refractive power having a concave image-side surface, wherein an object-side surface and the image-side surface of the fifth lens element are aspheric, and at least one of the object-side surface and the image-side surface thereof has at least one inflection point;
- wherein the photographing optical lens assembly has a total of five lens elements with refractive power, there is an air space between every two lens elements of the first lens element, the second lens element, the third lens element, the fourth lens element and the fifth lens element adjacent to each other, a wavelength correspondent to a 50% transmittance of the photographing optical lens assembly is $\lambda t50$, a sum of central thicknesses of the lens elements with refractive power is $\Sigma CT$, an axial distance between an object-side surface of a lens element closest to an object and an image-side surface of a lens element closest to an image surface is TD, a curvature radius of the object-side surface of the lens element closest to the object is R1, a curvature radius of the image-side surface of the lens element closest to the image surface is Rlast, an axial distance between the object-side surface of the lens element closest to the object and the image surface is TL, and the following conditions are satisfied:

$0.00\ nm<(\lambda t50-400\ nm)\times(500\ nm-\lambda t50)/\lambda t50<5.55\ nm;$ $0.50<\Sigma CT/TD<0.90;$ $0<R1/Rlast<3.0;$ and $TL<8.5\ mm.$ 10. The photographing optical lens assembly of claim 9, wherein the third lens element has positive refractive power.

11. The photographing optical lens assembly of claim 9, wherein the fourth lens element has the image-side surface being convex, and the fifth lens element has the object-side surface being convex.

12. The photographing optical lens assembly of claim 9, wherein a maximum of refractive indexes of the lens elements with refractive power is Nmax, and the following condition is satisfied:

$1.50<Nmax<1.70.$

13. The photographing optical lens assembly of claim 9, wherein an Abbe number of the first lens element is V1, an Abbe number of the second lens element is V2, an Abbe number of the fourth lens element is V4, and the following condition is satisfied:

$0.5<(V2+V4)/V1<1.0.$

14. The photographing optical lens assembly of claim 9, wherein a minimum of central thicknesses of the lens elements with refractive power is CTmin, and the following condition is satisfied:

$CTmin<0.30\ mm.$

15. The photographing optical lens assembly of claim 9, wherein an average transmittance of the photographing optical lens assembly in a wavelength range of 390 nm to 410 nm is Tavg390~410, and the following condition is satisfied:

$Tavg390\text{\textasciitilde}410<30\%.$

16. A photographing optical lens assembly comprising, in order from an object side to an image side:
- a first lens element with positive refractive power having a convex object-side surface, wherein the object-side surface and an image-side surface of the first lens element are aspheric;
- a second lens element having refractive power, wherein an object-side surface and an image-side surface of the second lens element are aspheric, and the second lens element is made of plastic material;
- a third lens element having refractive power, wherein an object-side surface and an image-side surface of the third lens element are aspheric, and the third lens element is made of plastic material;
- a fourth lens element having refractive power, wherein an object-side surface and an image-side surface of the fourth lens element are aspheric, and the fourth lens element is made of plastic material;
- a fifth lens element having refractive power, wherein an object-side surface and an image-side surface of the fifth lens element are aspheric, and the fifth lens element is made of plastic material; and
- a sixth lens element with refractive power having a concave image-side surface, wherein an object-side surface and the image-side surface of the sixth lens element are aspheric, at least one of the object-side surface and the image-side surface thereof has at least one inflection point, and the sixth lens element is made of plastic material;
- wherein the photographing optical lens assembly has a total of six lens elements with refractive power, there is an air space between every two lens elements of the first lens element, the second lens element, the third lens element, the fourth lens element, the fifth lens element and the sixth lens element adjacent to each other, a wavelength correspondent to a 50% transmittance of the photographing optical lens assembly is $\lambda t50$, a sum of central thicknesses of the lens elements with refractive power is $\Sigma CT$, an axial distance between an object-side surface of a lens element closest to an object and an image-side surface of a lens element closest to an image surface is TD, a curvature radius of the object-side surface of the lens element closest to the object is R1, a curvature radius of the image-side surface of the lens element closest to the image surface is Rlast, an axial distance between the object-side surface of the lens element closest to the object and the image surface is TL, and the following conditions are satisfied:

$0.00\ nm<(\lambda t50-400\ nm)\times(500\ nm-\lambda t50)/\lambda t50<5.55\ nm;$ $0.50<\Sigma CT/TD<0.90;$ $0<R1/Rlast<3.0;$ and $TL<8.5\ mm.$ 17. The photographing optical lens assembly of claim 16, wherein the wavelength correspondent to the 50% transmittance of the photographing optical lens assembly is λt50, and the following condition is satisfied:

$$3.50 \text{ nm} < (\lambda t50 - 400 \text{ nm}) \times (500 \text{ nm} - \lambda t50)/\lambda t50 < 5.55 \text{ nm}.$$

18. The photographing optical lens assembly of claim 16, wherein the fourth lens element has negative refractive power, the fifth lens element has positive refractive power, and the sixth lens element has negative refractive power.

19. The photographing optical lens assembly of claim 16, wherein the second lens element has negative refractive power, and the fifth lens element has the object-side surface being convex and the image-side surface being concave.

20. The photographing optical lens assembly of claim 16, wherein a focal length of the photographing optical lens assembly is f, an entrance pupil diameter of the photographing optical lens assembly is EPD, and the following condition is satisfied:

$$f/EPD < 2.4.$$

21. The photographing optical lens assembly of claim 16, wherein the fourth lens has the object-side surface being concave and the image-side surface being convex, the axial distance between the object-side surface of the lens element closest to the object and the image surface is TL, a maximum image height of the photographing optical lens assembly is ImgH, and the following condition is satisfied:

$$1.0 < TL/\text{ImgH} < 2.0.$$

22. The photographing optical lens assembly of claim 16, wherein an average transmittance of the photographing optical lens assembly in a wavelength range of 400 nm to 450 nm is Tavg400~450, and the following condition is satisfied:

$$40\% < T\text{avg}400\text{~}450 < 60\%.$$

23. An image capturing unit, comprising:
the photographing optical lens assembly of claim 16; and
an image sensor disposed on the image surface of the photographing optical lens assembly, wherein a resolution of the image sensor is greater than or equal to ten million pixels.

24. An image capturing unit, comprising:
the photographing optical lens assembly of claim 16; and
an optical image stabilization element connected with the photographing optical lens assembly.

25. A photographing optical lens assembly, comprising:
at least five lens elements having refractive power, wherein an object-side surface and an image-side surface of each of the lens elements are aspheric;
wherein at least one of the object-side surface and the image-side surface of at least one of the lens elements has at least one inflection point, there is an air space between every two lens elements adjacent to each other, a wavelength correspondent to a 50% transmittance of the photographing optical lens assembly is λt50, an average transmittance of the photographing optical lens assembly in a wavelength range of 400 nm to 450 nm is Tavg400~450, a sum of central thicknesses of the lens elements with refractive power is ΣCT, an axial distance between an object-side surface of a lens element closest to an object and an image-side surface of a lens element closest to an image surface is TD, an axial distance between the object-side surface of the lens element closest to the object and the image surface is TL, and the following conditions are satisfied:

$$0.00 \text{ nm} < (\lambda t50 - 400 \text{ nm}) \times (500 \text{ nm} - \lambda t50)/\lambda t50 < 5.55 \text{ nm};$$

$$30\% < T\text{avg}400\text{~}450 < 60\%;$$

$$0.50 < \Sigma CT/TD < 0.90; \text{ and}$$

$$TL < 8.5 \text{ mm}.$$

26. The photographing optical lens assembly of claim 25, wherein the wavelength correspondent to the 50% transmittance of the photographing optical lens assembly is λt50, and the following condition is satisfied:

$$3.50 \text{ nm} < (\lambda t50 - 400 \text{ nm}) \times (500 \text{ nm} - \lambda t50)/\lambda t50 < 5.55 \text{ nm}.$$

27. The photographing optical lens assembly of claim 26, wherein the wavelength correspondent to the 50% transmittance of the photographing optical lens assembly is λt50, and the following condition is satisfied:

$$4.00 \text{ nm} < (\lambda t50 - 400 \text{ nm}) \times (500 \text{ nm} - \lambda t50)/\lambda t50 < 5.55 \text{ nm}.$$

28. The photographing optical lens assembly of claim 25, wherein a minimum of central thicknesses of the lens elements with refractive power is CTmin, and the following condition is satisfied:

$$CT\text{min} < 0.30 \text{ mm}.$$

29. The photographing optical lens assembly of claim 25, wherein a curvature radius of the object-side surface of the lens element closest to the object is R1, a curvature radius of the image-side surface of the lens element closest to the image surface is Rlast, and the following condition is satisfied:

$$0 < R1/R\text{last} < 3.0.$$

30. The photographing optical lens assembly of claim 25, wherein a half of a maximal field of view of the photographing optical lens assembly is HFOV, and the following condition is satisfied:

$$0.70 < \tan(\text{HFOV}) < 1.20.$$

31. The photographing optical lens assembly of claim 25, wherein the object-side surface of the lens element closest to the object is convex, the lens element closest to the object has positive refractive power, the axial distance between the object-side surface of the lens element closest to the object and the image surface is TL, and the following condition is satisfied:

$$TL < 6.5 \text{ mm}.$$

32. The photographing optical lens assembly of claim 25, wherein an average transmittance of the photographing optical lens assembly in a wavelength range of 410 nm to 430 nm is Tavg410~430, and the following condition is satisfied:

$$45\% < T\text{avg}410\text{~}430 < 55\%.$$

33. The photographing optical lens assembly of claim 26, wherein at least one of the lens elements is a short wavelength cut filter by absorption.

34. The photographing optical lens assembly of claim 26, wherein at least one of the lens elements is a short wavelength cut filter by reflection.

35. An electronic device, comprising:
   at least two image capturing units, each of the image capturing unit comprising:
      the photographing optical lens assembly of claim 25; and
      an image sensor disposed on the image surface of the photographing optical lens assembly.

* * * * *